(12) United States Patent
Balakrishnan et al.

(10) Patent No.: US 10,824,585 B2
(45) Date of Patent: *Nov. 3, 2020

(54) COMPARISON-BASED SORT IN A RECONFIGURABLE ARRAY PROCESSOR HAVING MULTIPLE PROCESSING ELEMENTS FOR SORTING ARRAY ELEMENTS

(71) Applicant: International Business Machines Corporation, Armonk, NY (US)

(72) Inventors: Ganesh Balakrishnan, Apex, NC (US); Bartholomew Blaner, Underhill Center, VT (US); John J. Reilly, Burlington, VT (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/132,049

(22) Filed: Sep. 14, 2018

(65) Prior Publication Data
US 2019/0012169 A1 Jan. 10, 2019

Related U.S. Application Data

(63) Continuation of application No. 15/799,033, filed on Oct. 31, 2017, now Pat. No. 10,078,513, which is a
(Continued)

(51) Int. Cl.
*G06F 15/78* (2006.01)
*G06F 9/30* (2018.01)
*G06F 9/38* (2018.01)

(52) U.S. Cl.
CPC ...... *G06F 15/7867* (2013.01); *G06F 9/30021* (2013.01); *G06F 9/30032* (2013.01); *G06F 9/383* (2013.01); *G06F 15/7885* (2013.01)

(58) Field of Classification Search
CPC ............................. G06F 7/36; G06F 15/7867
See application file for complete search history.

(56) References Cited

U.S. PATENT DOCUMENTS

| 4,551,814 A | 11/1985 | Moore et al. |
| 4,551,815 A | 11/1985 | Moore et al. |
| (Continued) | | |

OTHER PUBLICATIONS

"U.S. Appl. No. 14/492,827 FAI-Office Action Summary", dated Mar. 30, 2017, 16 pages.
(Continued)

*Primary Examiner* — Jyoti Mehta
(74) *Attorney, Agent, or Firm* — Tihon Poltavets

(57) ABSTRACT

An array processor includes a managing element having a load streaming unit coupled to multiple processing elements. The load streaming unit provides input data portions to each of a first subset of the processing elements and also receives output data from each of a second subset of the processing elements based on a comparatively sorted combination of the input data portions provided to the first subset of processing elements. Furthermore, each of processing elements is configurable by the managing element to compare input data portions received from either the load streaming unit or two or more of the other processing elements, wherein the input data portions are stored for processing in respective queues. Each processing unit is further configurable to select an input data portion to be output data based on the comparison, and in response to selecting the input data portion, remove a queue entry corresponding to the selected input data portion. Each processing element may be further configured to provide the selected output data portion to either the managing element or as an input to one of the processing elements.

10 Claims, 11 Drawing Sheets

Related U.S. Application Data continuation of application No. 14/530,027, filed on Oct. 31, 2014, now Pat. No. 9,891,912.

(56) References Cited

U.S. PATENT DOCUMENTS

| | | | |
|---|---|---|---|
| 4,722,084 | A | 1/1988 | Morton |
| 4,939,642 | A | 7/1990 | Blank |
| 4,939,727 | A | 7/1990 | Gianola et al. |
| 4,949,175 | A | 8/1990 | Wind |
| 5,525,982 | A | 6/1996 | Cheng et al. |
| 6,131,092 | A | 10/2000 | Masand |
| 6,721,789 | B1 | 4/2004 | Demoney |
| 9,934,030 | B2 | 4/2018 | Balakrishan et al. |
| 2004/0049672 | A1 | 3/2004 | Nollet et al. |
| 2007/0239752 | A1 | 10/2007 | Beitman |
| 2007/0260602 | A1 | 11/2007 | Taylor |
| 2008/0047008 | A1 | 2/2008 | Cho et al. |
| 2008/0168465 | A1 | 7/2008 | Tanaka |
| 2016/0085720 | A1 | 3/2016 | Abali et al. |
| 2016/0085721 | A1 | 3/2016 | Abali et al. |
| 2016/0124755 | A1 | 5/2016 | Balakrishnan et al. |
| 2016/0124900 | A1 | 5/2016 | Balakrishnan et al. |
| 2018/0060070 | A1 | 3/2018 | Balakrishnan et al. |

OTHER PUBLICATIONS

"U.S. Appl. No. 14/492,827 FAI-PreInterview Summary", dated Oct. 6, 2016, 5 pages.
"U.S. Appl. No. 14/492,827 Final Office Action", dated Jul. 11, 2018, 15 pages.
"U.S Appl. No. 14/492,827 Final Office Action", dated Jul. 13, 2017, 16 pages.
"U.S. Appl. No. 14/492,827 Office Action", dated Feb. 12, 2018, 14 pages.
"U.S. Appl. No. 14/530,027 FAI Office Action", dated Jun. 6, 2017, 6 pages.
"U.S. Appl. No. 14/530,027 FAI-PreInterview Summary", dated Mar. 23, 2017, 7 pages.
"U.S. Appl. No. 14/602,059 Final Office Action", dated Oct. 10, 2017, 18 pages.
"U.S. Appl. No. 14/602,059 Final Office Action", dated Jul. 3, 2018, 18 pages.
"U.S. Appl. No. 14/602,059 Office Action", dated Feb. 12, 2018, 17 pages.
"U.S. Appl. No. 14/602,059 Office Action", dated Jun. 29, 2017, 18 pages.
"U.S. Appl. No. 14/729,281 FAI Office Action", dated Jun. 6, 2017, 6 pages.
"U.S. Appl. No. 14/729,281 FAI-PreInterview Summary", dated Mar. 23, 2017, 7 pages.
Koch, et al., "FPGASort: A High Performance Sorting Architecture Exploiting Run-time Reconfiguration on FPGAs for Large Problem Sorting", 2011, 10 pages.
Lin, "Multiplexers and Demultiplexers", Retrieved from URL: www.cs.umd.edu/class/sum2003/cmsc311/Notes/Comb/mux.html, Nov. 30, 2004, 11 pages.
Marcelino, et al., "Sorting Units for FPGA-Based Embedded Systems", 2008, 13 pages.
Pramanik, et al., "A Hardware Pattern Matching Algorithm on a Dataflow", 1985, 6 pages.
Yadav, et al., "Hardware Architecture of a Parallel Pattern Matching Engine", 2007, 4 Pages.

COMPARISON-BASED SORT IN A RECONFIGURABLE ARRAY PROCESSOR HAVING MULTIPLE PROCESSING ELEMENTS FOR SORTING ARRAY ELEMENTS

RELATED APPLICATIONS

This application is a Continuation of, and claims the priority benefit of, U.S. application Ser. No. 15/799,033 filed Oct. 31, 2017 which is a Continuation of, and claims the priority benefit of, U.S. application Ser. No. 14/530,027 filed Oct. 31, 2014.

BACKGROUND

Embodiments of the inventive subject matter generally relate to the field of array processing and, more particularly, to comparison-based sort operations in an array processor.

Merge-sort is an example comparison-based sorting technique that can be used to combine multiple streams of input data or to sort elements within a single stream of input data. Comparison-based sorting techniques such as merge-sort can be used in map-reduce operations, database searches, analytics, and other big data applications.

SUMMARY

In one embodiment, an array processor includes a managing element having a load streaming unit coupled to multiple processing elements. The load streaming unit provides input data portions to each of a first subset of the processing elements and also receives output data from each of a second subset of the processing elements based on a comparatively sorted combination of the input data portions provided to the first subset of processing elements. Furthermore, each of processing elements is configurable by the managing element to compare input data portions received from either the load streaming unit or two or more of the other processing elements, wherein the input data portions are stored for processing in respective queues. Each processing unit is further configurable to select an input data portion to be output data based on the comparison, and in response to selecting the input data portion, remove a queue entry corresponding to the selected input data portion. Each processing element may be further configured to provide the selected output data portion to either the managing element or as an input to one of the processing elements.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences, and computer program products that embody techniques of the present inventive subject matter. However, it is understood that the described embodiments may be practiced without these specific details. Examples describe an array processor including processing elements that merge multiple input data streams into one or more sorted output data streams. The array processor can include multiple tiers of processing elements configured to merge any suitable number of input data streams into any suitable number of sorted output data streams. Well-known instruction instances, protocols, structures, and techniques have not been shown in detail in order not to obfuscate the description.

An array processor can be implemented for merging and sorting multiple input data streams. The array processor may include a processor array manager and an array of interconnected processing elements. Each processing element (PE) operates on two or more input data streams. The functionality of the PEs and the interconnections between the PEs can be configured depending on the type of operations to be executed by the array processor. As will be further described herein, the functionality of the PEs and the interconnections between the PEs can be configured for merging and sorting input data streams. The processor array manager can provide multiple different input data streams to each PE. Each PE executes comparison operations on the input data streams and generates a result that merges and sorts multiple received input data streams into an output data stream. The PEs may be organized hierarchically such that output data stream portions generated by one or more upper-level PEs are provided as input data stream portions to one or more lower-level PEs. The lower-level PEs compare the received input data stream portions and select one of the input data stream portions based on the comparison. In this manner, the input data streams are further merged and sorted as they propagate through each level of the PE hierarchy. A final-level PE generates a final output data stream that is a merged and sorted representation of all the input data streams.

Figure 1:
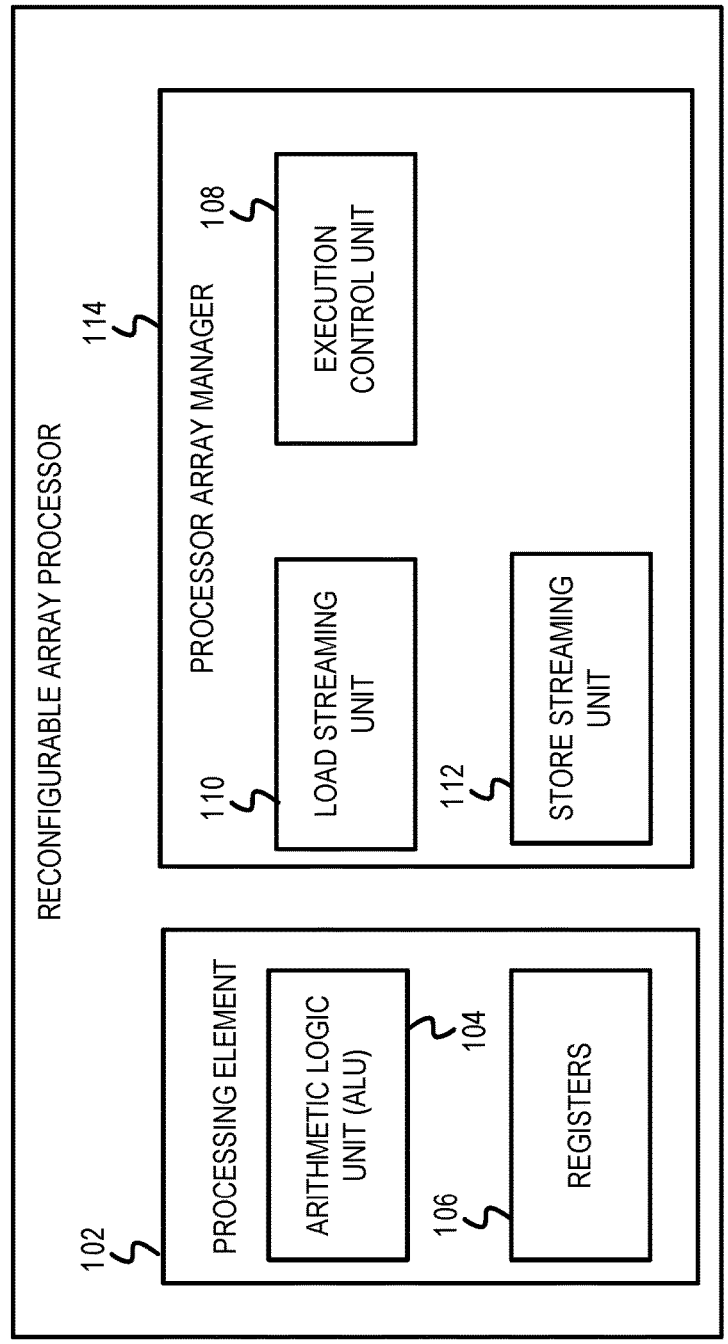
FIG. 1 is a block diagram illustrating an example array processor configured to perform merge-sort operations.

FIG. 1 is a block diagram illustrating one example of an array processor 100 configured to perform merge-sort operations. Array processor 100 (array processor 100) includes a processor array manager 114 and a processing element (PE)

102. Processor array manager 114 includes an execution control unit 108, a load streaming unit 110, and a store streaming unit 112. PE 102 includes an arithmetic logic unit (ALU) 104 and also includes registers 106 for queuing/buffering one or more bytes of input data streams to be merged and sorted. While only one PE is shown in FIG. 1 for simplicity of illustration, array processor 100 typically includes multiple interconnected PEs, as depicted and described with reference to FIGS. 2-5.

PE 102 executes operations in conjunction with processor array manager 114 to merge and sort two or more input data streams. In some embodiments, load streaming unit 110 may include multiple input channels, each receiving an input data stream. For example, if array processor 100 is configured to merge eight input data streams into one final output data stream, load streaming unit 110 would include eight input channels. Each input channel may be associated with a source address, a data stride, and a data length. The source address specifies a memory location from which a corresponding input data stream is to be retrieved. The data stride indicates the number of bits/bytes in each portion of the input data stream that is provided to the PEs. For example, the data stride may indicate whether load streaming unit 110 provides a byte, a quadword (e.g., 16-bytes), a double word (e.g., 8-bytes), or another suitable number of bits/bytes of the input data stream to PE 102. The data length indicates how many bytes of the input data stream are to be fetched and may be determined based on the depth of an input queue associated with a recipient PE. For example, if PE 102 can store four quadwords of an input data stream in its input queue, load streaming unit 110 may fetch 4×16 bytes (i.e., data length=64 bytes) of the input data stream.

Load streaming unit 110 provides portions of input data streams to PE 102. For example, to merge and sort two input data streams, load streaming unit 110 provides a portion (e.g., quadword, 8 bytes, 32 bytes, etc.) of a first input data stream and a portion of a second input data stream to PE 102. Within PE 102, ALU 104 compares the provided portion of the first input data stream with the provided portion of the second input data stream. ALU 104 generates a portion of an output data stream in accordance with whether the compared portion of the first input data stream is greater (e.g., has a higher value) than the portion of the second input data stream to which it is compared. For example, ALU 104 may compare a quadword of the first input data stream with a quadword of the second input data stream and select the quadword of the first input data stream to be output data if the quadword of the first input data stream is less than or equal to the quadword of the second input data stream. Alternatively, PE 102 may use other comparative techniques to generate the output data depending on how the input data streams are to be sorted and merged (e.g., whether in ascending order, descending order, etc.).

The PEs of array processor 100 can be organized in a hierarchical manner (e.g., forming a tree structure) such that output data streams generated by sets, or "tiers," of one or more upper-level PEs are provided to sets of one or more lower-level PEs. The lower-level PEs merge and sort the output data streams received from one or more upper-level PEs to generate output data streams. In this manner, data streams received as inputs from load streaming unit 110 propagate through and are further merged and sorted at each level of the PE hierarchy. A final-level PE generates a final output data stream that is a merged and sorted representation of all beginning and intermediate input data streams.

Store streaming unit 112 may include one or more output channels, depending on the number of final output data streams that are generated by the PEs. Each output channel of streaming unit 112 may be associated with a destination address and a data stride. The destination address specifies a memory location at which the corresponding final output data stream is to be stored. The data stride indicates how many bits/bytes of the final output data stream will be received from a PE. For example, the data stride may indicate whether store streaming unit 112 will receive a quadword, a double word, or another suitable number of bits/bytes from PE 102. Store streaming unit 112 stores a received portion of a final output data stream at the specified destination address and then update the specified destination address for storing the next portion of the final output data stream ("next output data").

Store streaming unit 112 stores the portion of the final output data stream in a store queue, such as a first-in-first-out (FIFO) queue. Furthermore, store streaming unit 112 may transmit a flow control signal to PE 102 in response to: receiving the stride-specified portion of the final output data stream; storing one or more entries from the store queue to the destination address; and/or determining that there is an empty register in the store queue. The flow control signal indicates that store streaming unit 112 has an empty register available to store a next output data (e.g., a next quadword of the final output data stream). The flow control signal can be propagated upwards through the PE hierarchy (i.e., backward through the data stream processing flow) such that the PEs at each level/tier notify an upper-level PE to provide the next output data. In response to receiving the flow control signal, load streaming unit 110 provides a next portion of the input data streams to the appropriate PEs.

The configuration and interconnection of the PEs in an array processor may vary depending on the type of application, as will be further depicted and described with reference to FIG. 2. For example, execution control unit 108 logically configures the PEs for a merge-sort application by initializing registers 106 and providing a set of instructions to PEs 102 and components of array manager 114. Execution control unit 108 may disable those components of PE 102 and/or processor array manager 114 that are not required for a particular merge-sort application. Operations of PE 102 will be further described with reference to FIGS. 2-7 and 9-10. Operations of processor array manager 114 will be further described with reference to FIGS. 5 and 8-10.

Figure 2:
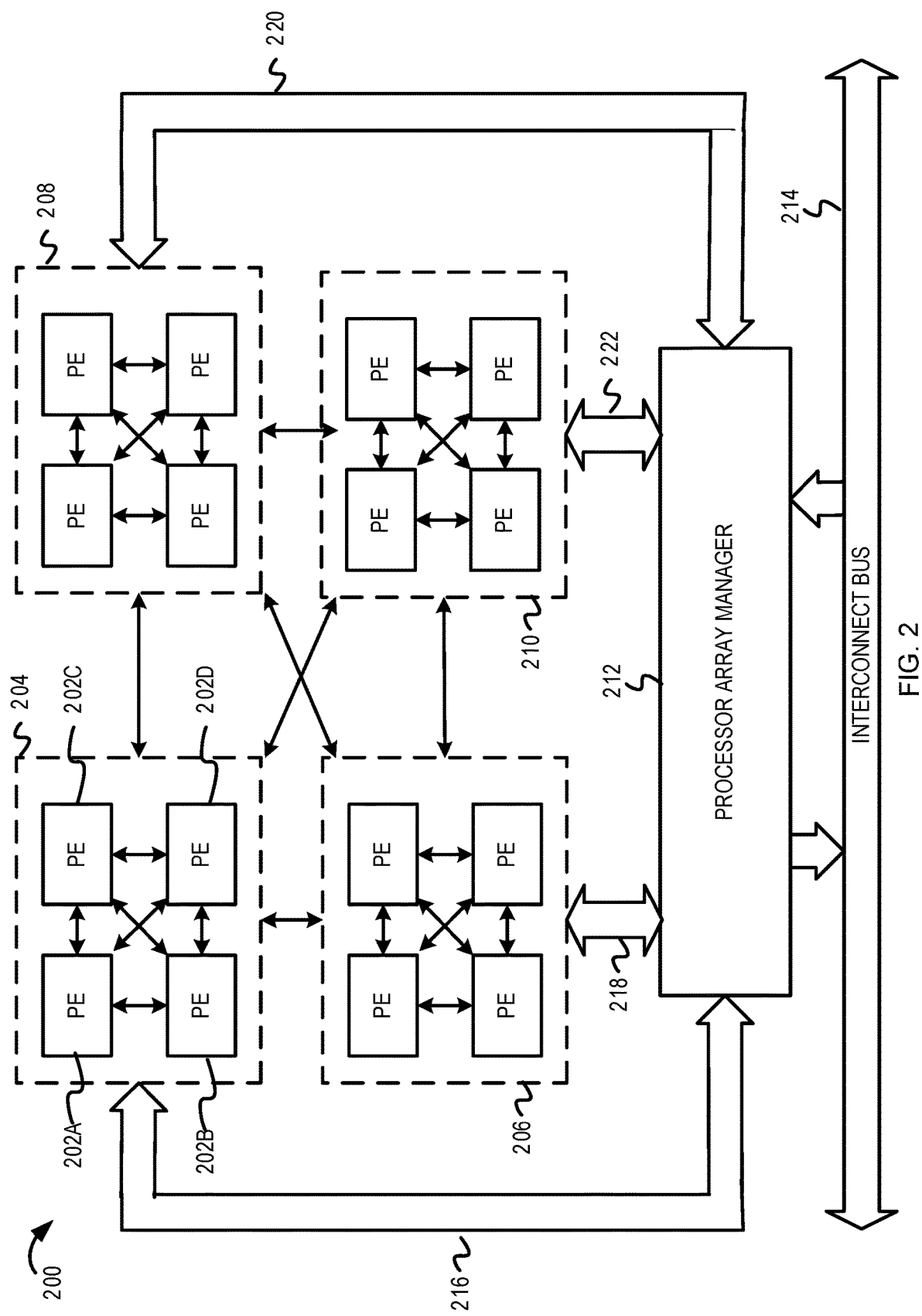
FIG. 2 is a block diagram of an array processor showing example interconnections between processing elements.

FIG. 2 depicts an example array processor 200 (array processor 200) that includes 16 PEs, a processor array manager 212, and an interconnect bus 214. As illustrated by the dashed line groupings of PEs, subsets of the PEs may be grouped together to form PE clusters. The PEs of array processor 200 are divided into PE clusters 204, 206, 208, and 210, each including four PEs. For example, PE cluster 204 comprises PEs 202A, 202B, 202C, and 202D. The PEs within a cluster may be "fully interconnected," such as depicted in FIG. 2, with each of PEs 202A, 202B, 202C, and 202D of PE cluster 204 being communicatively coupled with every other intra-cluster PE. Additionally, in some implementations, each PE cluster of array processor 200 may be interconnected with every other intra-array cluster. For example, PE clusters 204, 206, 208, and 210 may be fully interconnected as depicted in FIG. 2. PE interconnection configurations as well as cluster interconnection configurations may be programmably modified. Such programmable configurability determines, for example, whether one or more of PEs 202A, 202B, 202C, and 202D are logically interconnected and/or whether PE clusters 206 and 208 are logically interconnected to perform comparison-based sort operations. More generally, PE clusters and/or the PEs within a particular PE cluster may be interconnected in several suitable manners such as described herein depending on the function to which array processor 200 is being applied. For example, the PEs and/or the PE clusters may be interconnected in a first mode for a merge-sort application. As another example, the PEs and/or the PE clusters may be interconnected in a second mode for a hashing application.

PE clusters 204, 206, 208, and 210 are each coupled with processor array manager 212 via load/store data buses 216, 218, 220, and 222, respectively, over which the cluster PEs receive input data for processing, and provide corresponding results to processor array manager 212. In some embodiments, each PE cluster may include a PE cluster manager that receives input data via a load/store data bus and distributes the input data to one or more PEs within the cluster. For example, the PE cluster manager may receive results generated by one or more PEs within the cluster and provide the results to processor array manager 212. In other embodiments, each PE may be coupled with processor array manager 212 via a load/store data bus over which processor array manager 212 sends and receives multiple data streams to and from one or more PEs. Interconnect bus 214 may be an on-chip bus or switching fabric that couples processor array manager 212 to on-chip memory, off-chip memory, other processors, and/or caches. Processor array manager 212 receives input data to be provided to the PEs from memory via interconnect bus 214 and stores results from the PEs to memory via interconnect bus 214.

Referring back to FIG. 1, execution control unit 108 may receive an indication of a program (e.g., set of instructions) to be executed by array processor 100. For example, execution control unit 108 may receive a command, which includes a program address that indicates where the program is stored in memory. Execution control unit 108 fetches the program and loads the program for subsequent execution by processor array manager 114 and PE 102. In some embodiments, the program may be tailored to the number of PEs, the number of PE clusters, and/or the number of PEs per PE cluster within array processor 100. The program may also indicate how the PEs and/or PE clusters should be interconnected for the corresponding application. For example, a merge-sort program may identify the PEs and/or PE clusters that should be enabled and may also indicate which interconnections between the PEs and/or PE clusters should be enabled. The interconnections between the PEs and/or between PE clusters controls the flow of input data operands to the PEs and the flow of results generated by the PEs. The operands may be sourced from memory or may be constants that are programmed in each PE. The program may include, or indicate an address from which to retrieve, a micro-program to be executed by each PE for a comparison-based sort application. The comparison-based sort program may also indicate at least one source address from which input data should be accessed and at least one destination address to which output data (e.g., results) should be stored.

Figure 3:
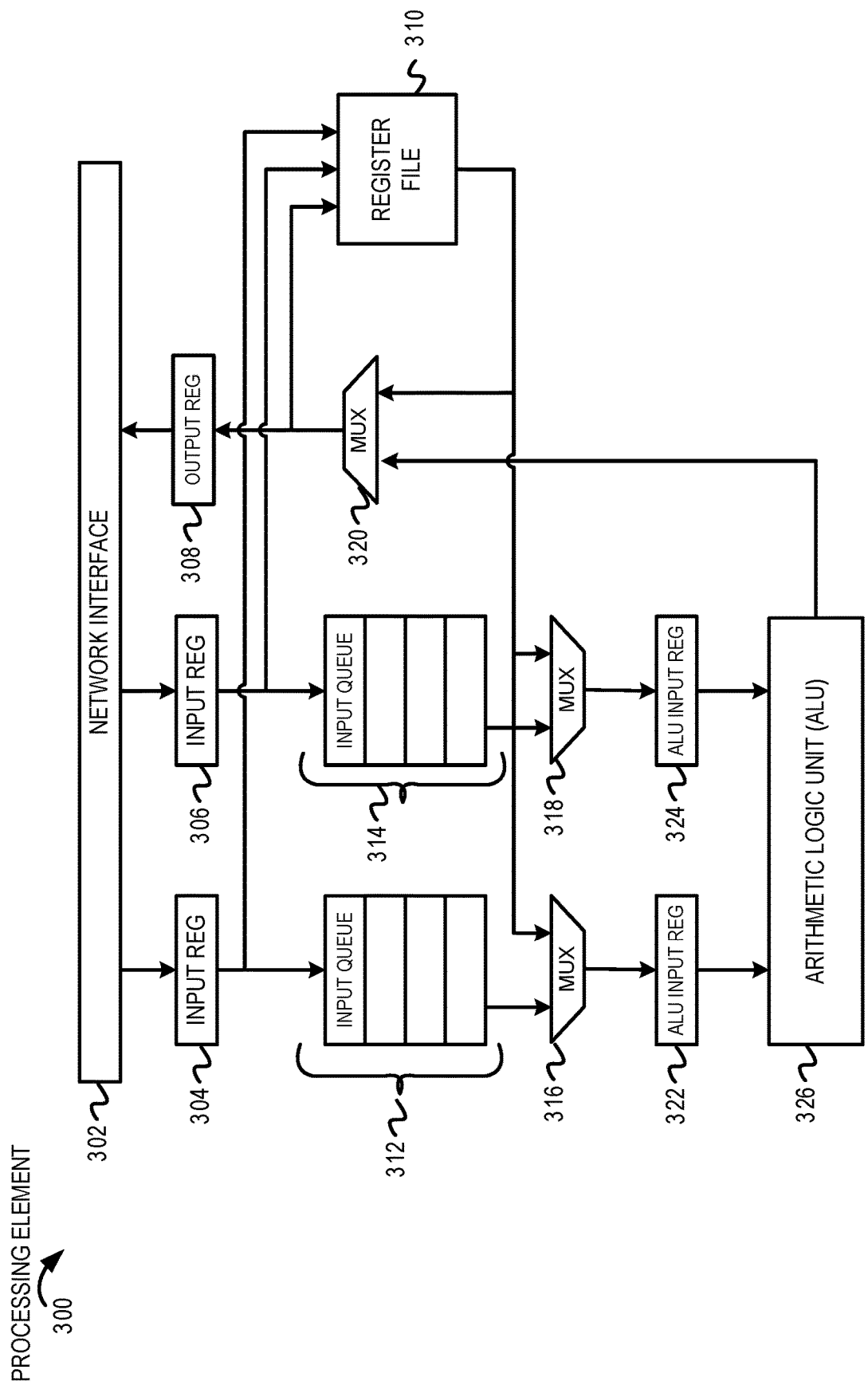
FIG. 3 is a block diagram illustrating an example structure of a processing element.

FIG. 3 is a block diagram illustrating a PE 300 that includes input registers 304 and 306, input queues 312 and 314, multiplexers 316, 318, and 320, a general-purpose register file 310, ALU input registers 322 and 324, an output register 308, an ALU 326, and a network interface 302. ALU 326 executes arithmetic and/or logical operations, writing execution results to register file 310 and reading the results for subsequent calculations. Register file 310 may include reference data values for comparison, combination, and other operations. Input registers 304 and 306 store next input data for input queues 312 and 314, respectively, receiving input data via network interface 302 and providing the input data to an appropriate input queue or to register file 310. Multiplexer (MUX) 316 receives inputs from input queue 312 and register file 310. Likewise, MUX 318 receives inputs from input queue 314 and register file 310. Each MUX 316 and 318 selects one of the inputs (e.g., either the input data stored in the input queue or data stored in register file 310) to be provided as output.

The outputs of MUXes 316 and 318 are provided to ALU 326 via ALU input registers 322 and 324, respectively. In one embodiment, ALU 326 is a 16-byte single-instruction-multiple-data (SIMD) ALU. In one example of a comparison-based sort application, ALU 326 compares the input data in input queues 312 and 314 and generates a corresponding output. The output of ALU 326 may indicate whether the input data in input register 322 exceeds (e.g., has a higher value than) the input data in input register 324. The output of ALU 326 is provided to MUX 320, which selects either its input from ALU 326 or its input from register file 310 to be output to register 308, from which it can be sent via network interface 302 for subsequent storage and/or processing.

The components and interconnections depicted in FIG. 3 illustrate an example structure of PE 300. In other implementations, PEs in an array processor may include additional components (e.g., registers, logic elements, etc.) or may not include some components depicted in FIG. 3. Furthermore, depending on the application for which the array processor is configured to execute, one or more components of each PE 300 may be enabled or disabled to allow PE 300 to execute operations associated with the application. Similarly, one or more interconnections between components of PE 300 can be configured/reconfigured to enable PE 300 to execute operations associated with the application. For example, only input queues 312 and 314, and ALU 326 may be used for the comparison-based sort application described herein. The other components of PE 300 may be disabled.

Figure 4B:
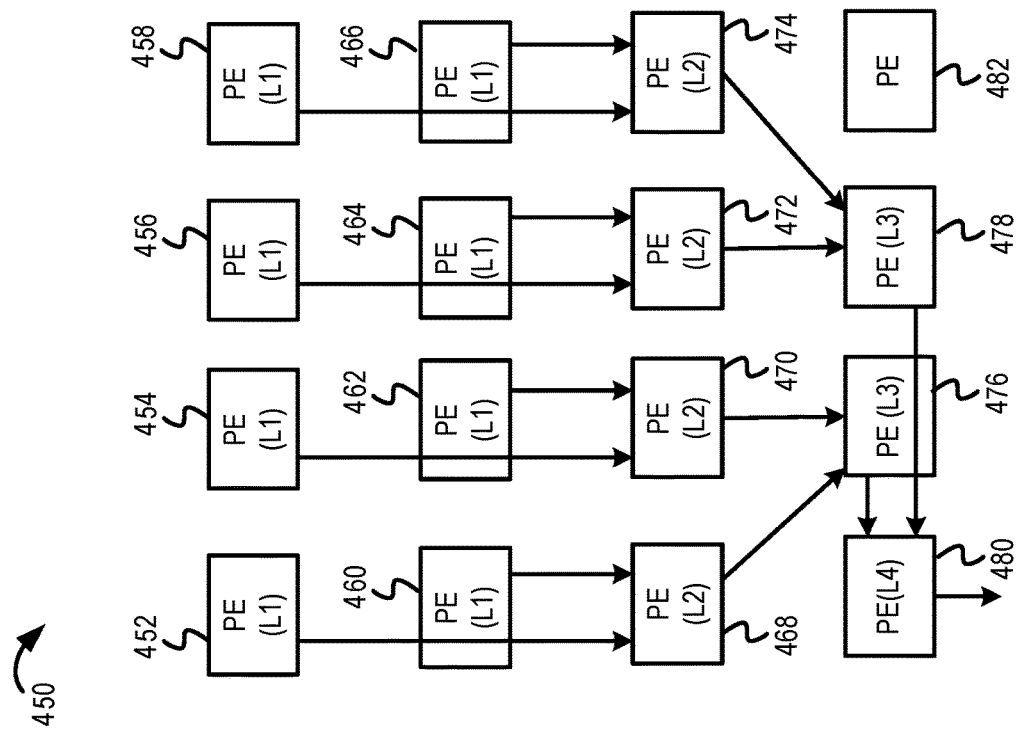
FIG. 4B is a block diagram illustrating an example implementation of a processor array for executing merge-sort operations on multiple input data streams.
Figure 4A:
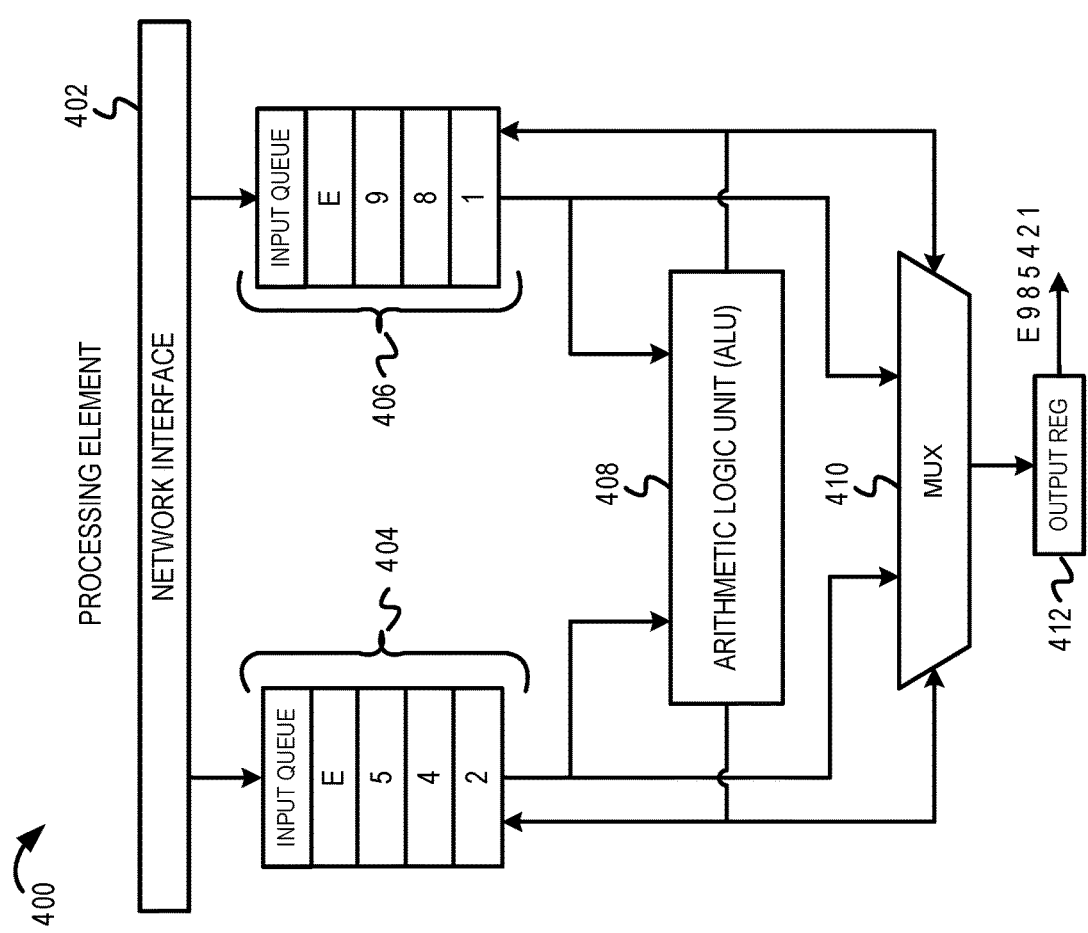
FIG. 4A is a block diagram illustrating an example structure of a processing element in a merge-sort configuration.

FIG. 4A is a block diagram illustrating an example structure of a PE 400 configured to perform merge-sort operations. PE 400 includes a network interface 402 and input queues 404 and 406 for accessing and queuing data stream inputs. PE 400 further includes an ALU 408 receiving inputs from input queues 404 and 406 and having outputs coupled to a control input of a MUX 410, which has an output coupled to an output register 412. As described with reference to FIG. 1, an execution control unit, such as execution control unit 108 may be used to configure PEs within an array processor, such as array processor 100, to perform merge-sort operations. To this end, an execution control unit may receive instructions for individually and collectively configuring the PEs, such as PE 400, within an array processor to perform merge-sort operations, including instructions that determine the logical interconnections between the PEs and the instructions to be executed by the PEs for merging and sorting input data streams. The instructions may be included in a merge-sort program that includes instructions for determining logical interconnections between components of a PE, including which components, if any, should be enabled/disabled.

Referring to FIG. 1 in conjunction with FIG. 4, execution control unit 108 loads a micro-program into each PE of array processor 100 to cause the PE to operate on a portion of one or more input data streams. In some embodiments, execution control unit 108 provides a program address at which the merge-sort micro-program is stored to ALU 408. In another embodiment, the merge-sort micro-program is stored in PE 400 (e.g., a program file or a control unit associated with PE 400). In another embodiment, PE 400 includes multiple micro-programs for different applications and execution control unit 108 provides a control signal to PE 400 to activate the merge-sort micro-program. If ALU 408 supports multiple sorting techniques, execution control unit 108 may also select and indicate which sorting technique should be used to sort the input data streams at PE 400. Execution control unit 108 may also provide control signals to initialize various registers of PE 400. For example, input queues 404 and 406 may be initialized and ALU 408 may include a program counter to indicate the address from which the next instruction of the micro-program should be accessed. Based on a control signal from execution control unit 108, the program counter may be initialized to store the address from which the first instruction of the micro-program should be accessed. Interconnections between PEs, interconnections between PE clusters, and/or interconnections between components of a processing element may be disabled based on control signals from execution control unit 108. For example, comparing FIGS. 3 and 4A, some components of PE 300 may be disabled and other components reconfigured for the merge-sort application. After configuring the array processor for the merge-sort application, execution control unit 108 can provide a notification to start executing the merge-sort operations.

For each input data stream sent via network interface 402, PE 400 can store a received portion of the input data stream in a corresponding input queue. For example, PE 400 may receive and store a portion of a first input data stream in input queue 404 and receive and store a portion of a second input data stream in input queue 406. Input queues 404 and 406 may each be a FIFO queue or another suitable type of queue. In one implementation, the received portion of the input data stream may be a quadword (e.g., 16 bytes), a byte, a double word (e.g., 8 bytes), etc. The head of input queue 404 includes the oldest entry (e.g., earliest received portion) of the first input data stream; while head of input queue 406 includes the oldest entry of the second input data stream. The connections between the components of PE 400 can be configured or reconfigured such that input queues 404 and 406 are coupled and applied to the inputs of ALU 408 and MUX 410.

ALU 408 receives the portion of the first input data stream at the head of input queue 404 and the portion of the second input data stream at the head of input queue 406 as operands. In response to detecting the operands, ALU 408 commences executing a merge-sort micro-program. As discussed with reference to FIG. 1, execution control unit 108 may load PE 400 with the micro-program which may include a set of instructions that PE 400 executes for merging and sorting input data streams. Each enabled/activated PE that receives operands can independently execute the micro-program and generate a corresponding result. Each result forms a portion of an output data stream that is provided either to the processor array manager or to a subsequent-level PE for merging/sorting with other input data streams.

In one implementation, ALU 408 executes a compare and pop operation ("cmp_n_pop") on the operands received from input queues 404 and 406. In this instance, the micro-program includes instructions to compare the portions of two input data streams and output the portion of a selected one of the input data streams. The portion of the input data streams may be an input data quadword, an input data byte, etc. An example micro-program that is executed by each PE in the array processor may be represented by cmp_n_pop fifo_a_fifo_b. In this example, the "cmp_n_pop" instruction causes ALU 408 to compare the portion of the first input data stream in a first input queue ("fifo_a") with the portion of the second input data stream in a second input queue ("fifo_b"). The cmp_n_pop instruction may execute in a single clock cycle, resulting in a throughput of one datum per cycle.

ALU 408 compares the operands and selects one of the operands to be included as a portion of the output data stream depending on how the input data streams are to be sorted, as will be further described with reference to Table 1. To this end, ALU 408 outputs a control signal to the control input of MUX 410 based on the result of the operand comparison. In one embodiment, the control signal generated by ALU 408 determines whether the head of input queue 404 or input queue 406 should be selected to be removed, or "popped," from its respective queue and output from MUX 410. In this manner, ALU 408 provides the control signal to the selected input queue to advance the input data in the input queue by one entry. For example, ALU 408 may determine that the head of input queue 404 should be popped. Accordingly, the control signal generated by the ALU 408 causes MUX 410 to select the input data at the head of input queue 404 as the output data of PE 400. The control signal also indicates to input queue 404 to advance the remaining input data in the input queue by 1 entry. Multiplexer 410 receives the portion of the first input data stream at the head of input queue 404 and the portion of the second input data stream at the head of input queue 406 as inputs. Multiplexer 410 selects one of the inputs to provide as output data based on the control signal received from ALU 408 and stores the output data in output register 412.

In one implementation, ALU 408 generates the output signal to pop the operand with a lower value, as depicted by the truth table of Table 1.

TABLE 1

| HEAD INPUT QUEUE A | HEAD INPUT QUEUE B | OUTPUT HEAD QUEUE A | OUTPUT HEAD QUEUE B | OUTPUT STREAM (Z) |
| --- | --- | --- | --- | --- |
| > head B & !E | !E | 0 | 1 | head B |
| ≤ head B & !E | !E | 1 | 0 | head A |
| E | X | 0 | 1 | head B |
| X | E | 1 | 0 | head A |
| E | E | 1 | 1 | E |

Table 1 illustrates a mechanism for merging and sorting the input data stored in two input queues A and B in ascending order. The data at the front of the queue that will be compared/processed is referred to as the head of the queue such that in depicted Table 1, the head of queue A is compared with the head of queue B. Table 1 indicates whether to output (or "pop") the head of queue A or the head of queue B based on this comparison. If the head of queue A is greater than the head of queue B and neither is an end-of-stream indicator (represented by 'E'), ALU 408 generates a control signal that causes queue logic (not depicted) controlling queues A and B to pop only the datum at the head of queue B. Accordingly, MUX 410 outputs the input data (e.g., quadword) at the head of queue B and forwards this to the output data stream via register 412. However, in response to determining that the head of queue A is less than or equal to the head of queue B and that neither is the end-of-stream indicator, ALU 408 generates a control signal that causes the queue control logic to only pop the datum at the head of queue A. Accordingly, MUX 410 outputs the input data at the head of queue A and forwards this to the output data stream. If the head of either input queue is the end-of-stream indicator, the head of the other queue is removed and forwarded to the output data stream. However, if the head of both input queues is the end-of-stream indicator, the head of both the input queues are popped. In this manner, the end-of-stream indicator (E) is forwarded to the output data stream to indicate that that there are no additional input data and that PE 400 has completed the merge-sort operations.

Although Table 1 depicts a truth table for sorting two input data streams in the ascending order, embodiments are not so limited. In other embodiments, ALU 408 may sort any suitable number of input data streams in descending order or another suitable sequence. In some embodiments, the truth table for sorting the input data may be hardcoded as part of the cmp_n_pop instruction executed by the ALU 408. In another embodiment, ALU 408 may receive a truth table from the execution control unit during initialization. In another embodiment, ALU 408 may select a truth table (e.g., from a set of previously stored truth tables) based on a control signal from the execution control unit that indicates how the input data should be sorted. Furthermore, in some embodiments, PE 400 may not receive a sub-program for executing the merge-sort operations. The cmp_n_pop instruction may be one of the default operations of ALU 408. The execution control unit may provide a control signal to PE 400 to configure ALU 408 to execute the cmp_n_pop instruction in response to receiving an operand from each of input queues 404 and 406.

FIG. 4A further depicts example values in input queues 404 and 406 to illustrate operations for merging and sorting two input data streams using Table 1. As depicted in the example of FIG. 4A, input queue 404 stores input data 2, 4, 5, E of a first input data stream; while input queue 406 stores input data 1, 8, 9, E of a second input data stream. In this example, input data '2' is the head of input queue 404, while input data '1' is the head of input queue 406. ALU 408 compares the operands at the head of input queues 404 and 406 and selects the operand with a lower value, in accordance with the Table 1. In this example, ALU 408 compares the input data '2' and '1' and selects '1' as a portion of the output data stream. ALU 408 may provide a control signal to input queues 404 and 406 and MUX 410 indicating which operand should be popped and stored in output register 412. In this example, MUX 410 outputs the input data '1' from the head of input queue 406 and store the value in output register 412. ALU 408 may also provide the control signal to input queue 406 to cause the remaining entries (e.g., 8, 9, E) in input queue 406 to advance by 1 entry towards the head of input queue 406. Thus, the input data '8' is now the new head of input queue 406. At the next iteration, ALU 408 compares the head of input queues 404 and 406 (i.e., the input data '2' and '8'). ALU 408 causes queue 404 and MUX 410 to remove the input data '2' from the head of input queue 404. The remaining entries (e.g., 4, 5, E) in input queue 404 may advance by 1 entry towards the head of input queue 404. Thus, the input data '4' is now the new head of input queue 404. PE 400 executes these compare and pop operations until the end of stream indicators (E) are at the head of both input queues 404 and 406. At this point, the two input data streams {1, 8, 9} and {2, 4, 5} are merged and sorted to form a final output data stream {1, 2, 4, 5, 8, 9}. When the entry at the head of input queues 404 and 406 is 'E,' this indicates that the input data of both the input data streams have been merged and sorted.

In some embodiments, MUX 410 may store the output data generated at each iteration in the output register 412 and/or an output queue. PE 400 may transmit one or more of the output data values to the processor array manager or to a subsequent-level PE for further processing, as will be described with reference to FIGS. 4B and 5. In some embodiments, after transmitting the value in result register 412, PE 400 may reset the program counter and/or reset the result register.

FIG. 4B is a block diagram illustrating an example implementation of a processor array 450 for executing merge-sort operations on 16 input data streams. Processor array 450 includes 16 PEs 452-482, which as depicted in FIG. 4B are organized into multiple levels or tiers to merge and sort multiple input data streams into a final output data stream. The PEs may be organized into different levels by enabling and disabling interconnections between the PEs during an initialization process. For example, the interconnections between the PEs of FIG. 2 can be configured to yield the processor array 450 of FIG. 4B for merging and sorting 16 input data streams into a final output data stream. Comparing FIGS. 2 and 4B, PE 482 may be disabled, interconnections between PEs 452 and 454 may be disabled, and so on. In FIG. 4B, PEs 452, 454, 456, 458, 460, 462, 464, and 466 are first-level (L1) PEs. PEs 468, 470, 472, and 474 are second-level (L2) PEs. PEs 476 and 478 are third-level (L3) PEs. PE 480 is a fourth-level (L4) processing element.

First-level PEs 452-466 receive portions of input data streams from the processor array manager (not shown in FIG. 4B). First-level PEs 452-466 may also be referred to as initial-level PEs. The output data streams generated by first-level PEs 452-454, 456-458, 460-462, and 464-466 are provided to second-level PEs 468, 470, 472, and 474, respectively. The output data streams generated by second-level PEs 468-470 and 472-474 are provided to third-level PEs 476 and 478, respectively. The output data streams generated by third-level PEs 476 and 478 are provided to fourth-level PE 480. In this example, fourth-level PE 480 is a final-level PE, which provides the merged and sorted data stream to the processor array manager. More generally, each PE executes the merge-sort operations on received portions of input data streams, and provides a resultant portion of the output data stream to a subsequent-level PE. Portions of the input data streams are merged and sorted at each level of the hierarchy of PEs. The final-level PE generates a final output data stream that is a merged and sorted representation of all the input data streams.

Figure 5:
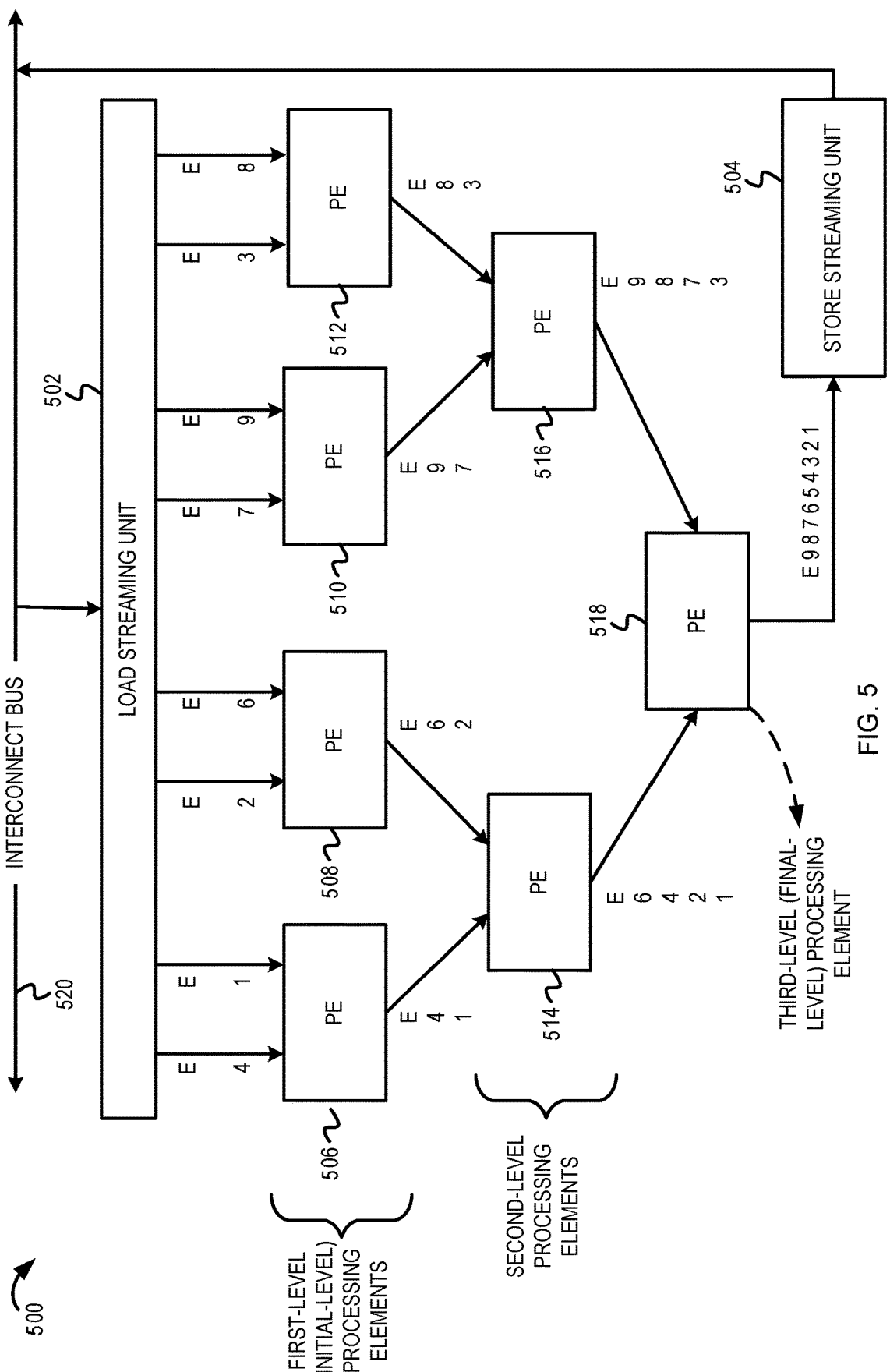
FIG. 5 is a block diagram illustrating an example array processor for executing merge-sort operations on multiple input data streams.

FIG. 5 is a block diagram illustrating an example implementation of an array processor 500 for executing merge-sort operations on eight input data streams. Array processor 500 includes PEs 506, 508, 510, 512, 514, 516, and 518. Array processor 500 also includes a load streaming unit 502, a store streaming unit 504, and an interconnect bus 520. Load streaming unit 502 may fetch input data streams via interconnect bus 520 and provide the input data streams to one or more of the PEs. Store streaming unit 504 may receive a final output data stream from the one or more of the PEs. Store streaming unit 504 may write the final output data stream to a suitable memory location via interconnect bus 520.

Load streaming unit 502 may determine a source address from which each input data stream should be fetched. For example, load streaming unit 502 can fetch each input data stream from a corresponding source address in response to receiving a control signal from the execution control unit (not shown in FIG. 5). In one implementation, the source address for each input data stream may be pre-programmed in load streaming unit 502. In another implementation, the execution control unit can provide the source address for each input data stream to load streaming unit 502. For each input data stream, load streaming unit 502 can fetch one or more bytes of the input data stream and provide these bytes to an appropriate processing element. In one implementation, load streaming unit 502 fetches the input data stream in the form of quadwords (i.e., 16 bytes). The number of bytes that are fetched per input data stream may depend on the number of empty registers in the input queue of the PE. In one example, the PE may have four empty registers in the input queue and may operate on one quadword (e.g., 16-bytes) of the input data stream. In this example, load streaming unit 502 may fetch 4×16 bytes of the input data stream. Alternatively, load streaming unit 502 may fetch any suitable number of bytes of each input data stream depending on the number of bytes that each PE can process, and/or the depth of the input queue associated with each PE. Load streaming unit 502 may determine whether to provide the input data streams to some/all of the PEs, which PEs to provide the input data streams, the number of bytes of each input data stream to provide to each processing element, etc. Load streaming unit 502 may make this determination based on the merge-sort program, a control signal from execution control unit 108, and/or a hardcoded instruction in load streaming unit 502.

In the example of FIG. 5, seven PEs are organized into a three-level hierarchy (also referred to as a "tree structure") to merge and sort eight input data streams into one final output data stream. The PEs may be organized into different levels by enabling and disabling interconnections between the PEs during an initialization process, as similarly described above with reference to FIG. 4B. In FIG. 5, PEs 506, 508, 510, and 512 are the first-level PEs or initial-level PEs. PEs 514 and 516 are the second-level PEs and PE 518 is a third-level PE or a final-level PE.

Each processing element receives two input data streams and generates an output data stream that is a sorted list of the two input data streams. First-level PEs 506, 508, 510, and 512 each receive different input data from two different input data streams. For example, PE 506 may receive quadwords from the first and second input data streams; PE 508 may receive quadwords from the third and fourth input data streams; PE 510 may receive quadwords from the fifth and sixth input data streams; and PE 512 may receive quadwords from the seventh and eighth input data streams. Each of the first-level PEs 506, 508, 510, and 512 may merge and sort their respective received input data streams to form a corresponding output data stream.

The first-level PEs 506 and 508 may provide their respective output data streams to the second-level processing element 514. For example, second-level processing element 514 may receive a quadword of the output data streams generated by first-level PEs 506 and 508. Likewise, first-level PEs 510 and 512 may provide their respective output data streams to second-level processing element 516. Each of second-level PEs 514 and 516 may merge and sort their respective received input data streams to form a corresponding output data stream. Second-level PEs 514 and 516 may provide their respective output data streams to third-level PE 518. For example, third-level PE 518 may receive a quadword of the output data streams generated by second-level PEs 514 and 516. Third-level (or final-level) PE 518 may merge and sort the received input data streams to form the final output data stream. PE 518 may then provide the final output data stream (e.g., a quadword of the final output data stream) to store streaming unit 504.

In FIG. 5, example values of input data streams and output data streams are included for each PE. As depicted in FIG. 5, first-level PE 506 receives input data '4' of a first input data stream and input data '1' of a second input data stream from load streaming unit 502. First-level PE 506 compares the input data '4' and '1' and determines which value to pop depending on the sequence in which the input data streams are to be sorted. For example, first-level PE 506 may determine to pop the input data with a lower value in accordance with the truth table of Table 1. Accordingly, first-level PE 506 can generate an output data stream including output data '1.' First-level PE 508 can receive input data '2' and '6' of a third input data stream and a fourth input data stream, respectively. First-level PE 508 can generate an output data stream including output data '2.' Likewise, first-level PEs 510 and 512 also generate their respective output data streams. Second-level PE 514 receives input data '1' and '2' from first-level PEs 506 and 508, respectively. In other words, the output data generated by first-level PEs 506 and 508 is provided as the input data to second-level PE 514, which can generate an output data stream including output data '1.' Likewise, second-level PE 516 can generate an output data stream including output data '3.' Third-level PE 518 receives input data '1' and '3' from second-level PEs 514 and 516, respectively. In other words, the output data generated by second-level PEs 514 and 516 is provided as the input data to third-level PE 518, which can generate an output data stream including output data '1.' In this example, PE 518 is a final-level PE and is coupled with the processor array manager (e.g., store streaming unit 504). Therefore, third-level PE 518 may provide the output data '1' to store streaming unit 504.

In some embodiments, the processor array manager may use suitable flow control techniques to control when the next portion of the input data streams is provided to a PE and when the PE should generate the next portion of the output data stream. In one example, store streaming unit 504 may transmit a flow control signal (also referred to as a "credit") to a final-level PE after receiving a portion of the final output data stream from the final-level PE. In response to receiving the flow control signal, the final-level PE can provide another flow control signal to one of the upper-level PEs that provide input data to the final-level PE. Thus, each current-level PE that receives the flow control signal can provide another flow control signal to an upper-level PE that provides input data to the current-level PE. A first-level PE that receives the flow control signal from a lower-level PE can transmit a flow control signal requesting input data of a particular input data stream from load streaming unit 502. In response to receiving the input data from load streaming unit 502, each PE can execute the merge sort operations described above to generate the next output data for their respective output data streams.

Referring to the example values of FIG. 5, store streaming unit 504 may provide a flow control signal to third-level PE 518 in response to receiving the output data '1' from PE 518. The flow control signal can indicate that store streaming unit 504 successfully received the output data '1' from PE 518. The flow control signal can also indicate third-level PE 518 should compare the next set of input data (if any) and provide the next output data to store streaming unit 504. In response to receiving the flow control signal from store streaming unit 504, third-level PE 518 can transmit another flow control signal to one of second-level PEs 514 and 516 that provided input data to PE 518. In this example, third-level PE 518 may determine that the input data received from second-level PE 514 was popped to generate the output data of third-level PE 518. In other words, third-level PE 518 may determine that an input queue for storing input data received from second-level PE 514 has an empty register. Therefore, third-level PE 518 may transmit the flow control signal to second-level PE 514 to request the next input data from second-level PE 514. Because the input data received from second-level PE 516 is still in the input queue of third-level PE 518, PE 518 may determine that an input queue for storing input data received from second-level PE 516 does not have an empty register. Therefore, third-level PE 518 may not transmit a flow control signal to and may not request additional input data from second-level PE 516.

In response to receiving the flow control signal from third-level PE 518, second-level PE 514 can transmit another flow control signal to one of first-level PEs 506 and 508 that provided input data to PE 514. In this example, second-level PE 514 may determine that the input data received from first-level PE 506 was popped to generate the output data of second-level PE 514. In other words, second-level PE 514 may determine that an input queue for storing input data received from first-level PE 506 has an empty register. Therefore, second-level PE 514 may transmit the flow control signal to first-level PE 506 to request the next input data from first-level PE 506. Because the input data received from first-level PE 508 is still in the input queue of second-level PE 514, PE 514 may determine that an input queue for storing input data received from first-level PE 508 does not have an empty register. Therefore, second-level PE 514 may not transmit a flow control signal to and may not request additional input data from first-level PE 506.

In response to receiving the flow control signal from second-level PE 514, first-level PE 506 transmits another flow control signal to load streaming unit 502. In this example, first-level PE 506 may determine that the input data of the second input data stream was popped to generate the output data of first-level PE 506. In other words, first-level PE 506 may determine that an input queue for storing input data of the second input data stream has an empty register. Therefore, first-level PE 506 may transmit the flow control signal to load streaming unit 502 to request the next input data of the second input data stream. Because the input data of the first input data stream is still in the input queue of first-level PE 506, PE 506 may determine that an input queue for storing input data of the first input data stream does not have an empty register. Therefore, first-level PE 506 may not request input data of the first input data stream from load streaming unit 502.

In response to receiving the flow control signal from first-level PE 506, load streaming unit 502 may provide the next input data of the second input data stream to first-level PE 506. In this example, first-level PE 506 receives the input data 'E' of the second input data stream. Here, 'E' represents an end-of stream indicator that indicates that there is no additional input data in the second input data stream. First-level PE 506 compares input data '4' of the first input data stream and the input data 'E' of the second input data stream. First-level PE 506 determines to pop the input data '4' as the next output data of its output data stream in accordance with the example of Table 1. First-level PE 506 provides the output data '4' to second-level PE 514, which compares input data '4' and '2' received from first-level PEs 506 and 508, respectively. Second-level PE 514 determines to pop the input data '2' as the next output data of its output data stream. Second-level PE 514 provides the output data '2' to third-level PE 518, which compares input data '2' and '3' received from second-level PEs 514 and 516 respectively. Third-level PE 518 determines to pop the input data '2' as the next output data of its output data stream by providing the output data '2' to store streaming unit 504 as the next output data in the final output data stream. Store streaming unit 504 can provide another flow control signal to third-level PE 518 in response to receiving the output data '2'. The flow control signal can be propagated up the hierarchy of PEs as similarly described above. However, in other embodiments, other suitable flow control techniques may be employed.

Store streaming unit 504 may also store the final output data stream at a destination address. In some embodiments, store streaming unit 504 receives the destination address during initialization (e.g., from the execution control unit 108). In another embodiment, the destination address may be pre-programmed into store streaming unit 504. In some embodiments, store streaming unit 504 may temporarily store each portion of the final output data stream in a store queue (not shown in FIG. 5). For example, store streaming unit 504 may receive a first quadword from final-level PE 518 after the PEs at each of the upper levels have merged and sorted quadwords from multiple input data streams. Store streaming unit 504 may store the first quadword of the final output data stream in the store queue. Store streaming unit 504 may similarly receive and store the subsequent quadwords of the final output data stream in the store queue. The quadwords of the final output data stream may be transferred (via interconnect bus 520) from the store queue to a data cache after the store queue is full, after a predetermined number of quadwords are stored in the store queue, after a predetermined time interval elapses, etc.

Although the examples describe input data streams comprising single digit scalar integers, embodiments are not so limited. In other embodiments, various other types and values of data can be streamed through the PEs for sorting and merging. For example, the input data streams may include vectors, floating-point integers, string values, symbols, or a combination of different characters (e.g., a combination of scalar integers and alphabets). Furthermore, although the examples represent the end of stream indicator using the 'E' character, embodiments are not so limited. In other embodiments, the end of the input data stream may be represented by a special character, a control signal, or another suitable indicator. In some embodiments, as depicted in FIG. 5, the end-of-stream indicator may be transmitted separately from the last portion of the input data stream. For example in FIG. 5, a quadword representing the end-of stream indicator 'E' is transmitted as a separate input data after the last quadword representing the input data '4' is transmitted to PE 506. However, in other embodiments, the end-of-stream indictor may be transmitted along with the last portion of the input data stream. For example, a message including the last quadword representing the input data '4' and a flag representing the end of the input data stream may be transmitted to PE 506. In other embodiments, other suitable indicators and/or techniques to indicate the end of the input data stream may be employed.

Figure 6:
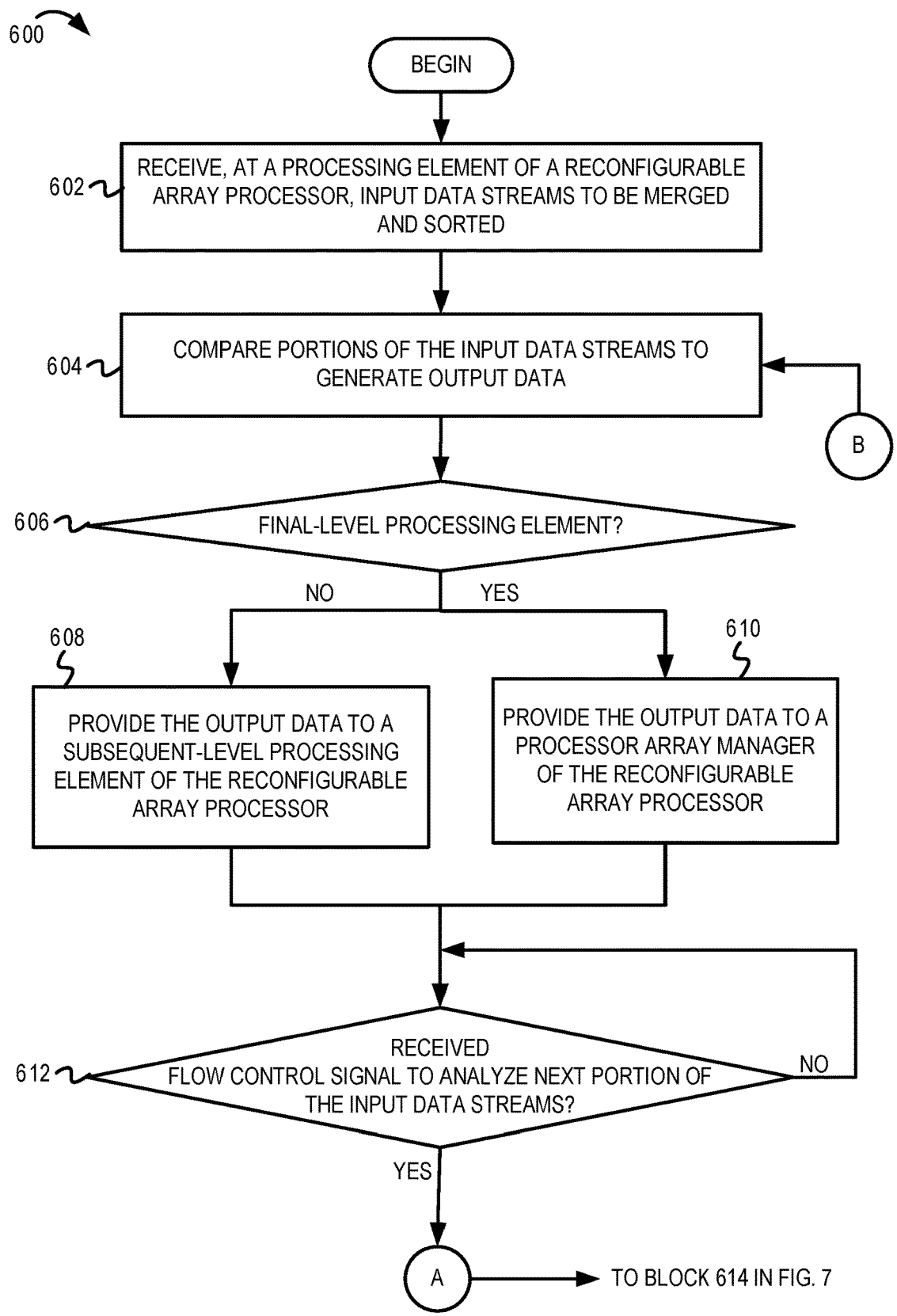
FIG. 6 is a flow diagram illustrating example operations of a processing element configured to perform merge sort operations.
Figure 7:
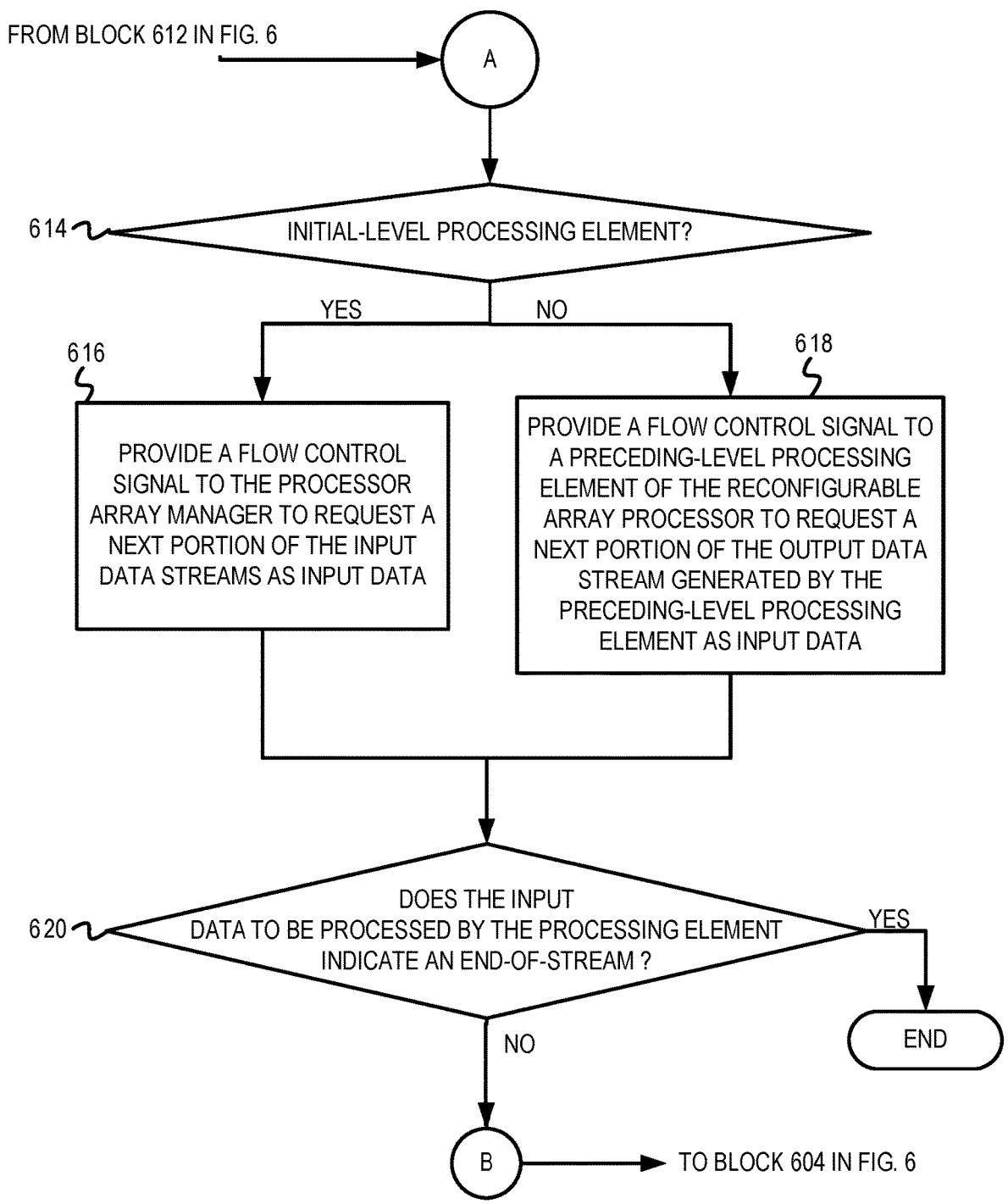
FIG. 7 is a continuation of FIG. 6 and also illustrates example operations of a processing element configured to perform merge sort operations.

FIGS. 6 and 7 depict a flow diagram illustrating example operations of a processing element in a merge sort configuration. Flow 600 begins at block 602 in FIG. 6.

Input data streams to be merged and sorted are received at a PE of a array (block 602). In some embodiments, the PE may be a first-level PE that receives the input data streams from a processor array manager of the array processor. In another embodiment, the PE may receive the input data streams from two or more upper-level PEs (also referred to as preceding-level PEs). In some embodiments, the PE may receive two input data streams that are to be merged and sorted into one output data stream, as described above with reference to FIGS. 1-5. In other embodiments, the PE may receive any suitable number of input data streams and may generate any suitable number of output data streams. In some embodiments, as part of an initialization process, a program counter of the PE may be updated to include the address of the first instruction of the merge-sort operations that will be executed by the PE. An output register of the PE may be initialized. The flow continues at block 604.

Portions of the input data streams are compared to generate output data (block 604). In one embodiment, the PE may receive a first quadword of a first input data stream and a second quadword of a second input data stream. The PE may compare the first quadword and the second quadword. The PE may select either the first quadword or the second quadword as the output data depending on the sorting technique being implemented by the PE. Referring to the example of Table 1, the PE may select the quadword with the lower value as the output data. It is noted that the PE can operate on any suitable number of bits/bytes of each input data stream and can use any suitable sorting technique to generate the output data. The flow continues at block 606.

It is determined whether the PE is a final-level PE (block 606). As described above, PEs in the array processor may be organized in a hierarchical manner to form a PE hierarchy (e.g., a tree structure). A final-level PE may generate a final output data stream that is a merged and sorted representation of all the input data streams distributed across the first-level PEs. As depicted in FIG. 5, the final-level PE may be coupled with a store streaming unit of the processor array manager. The PE may provide its output data to a lower-level PE or to the processor array manager of the array processor depending on the position of the PE in the hierarchy. If the PE is a not a final-level PE, the flow continues at block 608. Otherwise, the flow continues at block 610.

The output data is provided to a subsequent-level PE of the array processor (block 608). When the PE is not a final-level PE, the PE may provide its output data as an input to the subsequent-level processing level (also referred to as a lower-level PE) that is coupled with the PE. As depicted in the example of FIG. 5, PE 508 is not a final-level PE. PE 508 may provide its output data as an input to the subsequent-level PE 514. The flow continues at block 612.

The output data is provided to a processor array manager of the array processor (block 610). When the PE is a final-level PE, the PE may provide its output data to the processor array manager for subsequent storage. The output data generated by the final-level PE may be a portion (e.g., a quadword, a byte, etc.) of the final output data stream. The final output data stream may be a merged and sorted list of all the input data streams. As depicted in the example of FIG. 5, PE 518 is a final-level PE. PE 518 may provide its output data to the store streaming unit 504 of the processor array manager. The processor array manager can store the output data at a suitable destination address via an interconnect bus.

It is determined whether the PE received a flow control signal to analyze a next portion of the input data streams (block 612). If the PE is a final-level PE, the flow control signal can indicate that the processor array manager successfully received the output data. If the PE is not a final-level PE, the flow control signal can indicate that the subsequent-level PE successfully received the output data generated by the PE. In addition, the flow control signal can indicate that the PE should analyze the next set of input data and generate a next output data. The flow control signal can be propagated from the final-level PE, up the hierarchy of PEs, and to the load streaming unit of the processor array manager as similarly described above with reference to FIG. 5. If the PE received the flow control signal, the flow continues at block 614 in FIG. 7. Otherwise, the flow loops back to block 612 where the PE continues to wait for the flow control signal.

It is determined whether the PE is an initial-level PE (block 614). An initial-level PE (also referred to as a first-level PE) may be coupled with a load streaming unit of the processor array manager. The initial-level PE may receive input data of unmerged and unsorted input data streams. Referring to the example of FIG. 5, PE 508 is a first-level PE. PE 508 receives a portion of the first input data stream and a portion of the second input data stream for merging and sorting the first and the second input data streams. The PE may provide the flow control signal to an upper-level PE or to the processor array manager depending on the position of the PE in the hierarchy. If the PE is an initial-level PE, the flow continues at block 616. Otherwise, the flow continues at block 618.

A flow control signal is provided to the processor array manager to request a next portion of the input data streams (block 616). When the PE is an initial-level PE, the PE can transmit the flow control signal to the load streaming unit to request next input data associated with an input data stream. The next input data may be a next portion (e.g., a quadword, a byte, etc.) of one of the input data streams being analyzed by the PE. As depicted in the example of FIG. 5, PE 508 is an initial-level PE. PE 508 may receive a quadword (e.g., bytes 0-15) of the first input data stream and a quadword (e.g., bytes 0-15) of the second input data stream. PE 508 may provide a flow control signal to the load streaming unit 502 requesting a next portion of the second input data stream. Accordingly, PE 508 may receive the next quadword (e.g., bytes 16-31) of the second input data stream. The flow continues at block 620.

A flow control signal is provided to a preceding-level PE of the array processor to request a next portion of the output data stream generated by the preceding-level PE (block 618). When the PE is not an initial-level PE, the PE can transmit the flow control signal to a preceding-level PE (also referred to as an upper-level PE) to request next input data. The input data may be a next portion (e.g., a quadword, a byte, etc.) of the output data stream generated by the preceding-level PE. As depicted in the example of FIG. 5, PE 514 is not an initial-level PE. PE 514 may receive a quadword (e.g., bytes 0-15) of the output data streams generated by the preceding-level PEs 506 and 508. PE 508 may provide the flow control signal to one of the preceding-level PEs 506 and 508 depending on which quadword was popped to generate the output data of PE 514 as described above with reference to FIG. 5. For example, PE 514 may provide the flow control signal to request a next portion of the output data stream generated by the preceding-level PE 506. Accordingly, PE 514 may receive the next quadword (e.g., bytes 16-31) of the output data stream generated by the preceding-level PE 506. The flow continues at block 620.

It is determined whether the input data to be processed by the processing element indicates an end-of-stream. For example, it may be determined whether the input data at the head of each of the input queues of the PE represent an end-of-stream indicator. If the input data portions to be compared by the PE represent an end-of-stream indicator, the PE determines that there is no additional input data to sort and the flow ends. Otherwise, the flow loops back to block 604 in FIG. 6 where the PE compares next input data to generate next output data.

Figure 8:
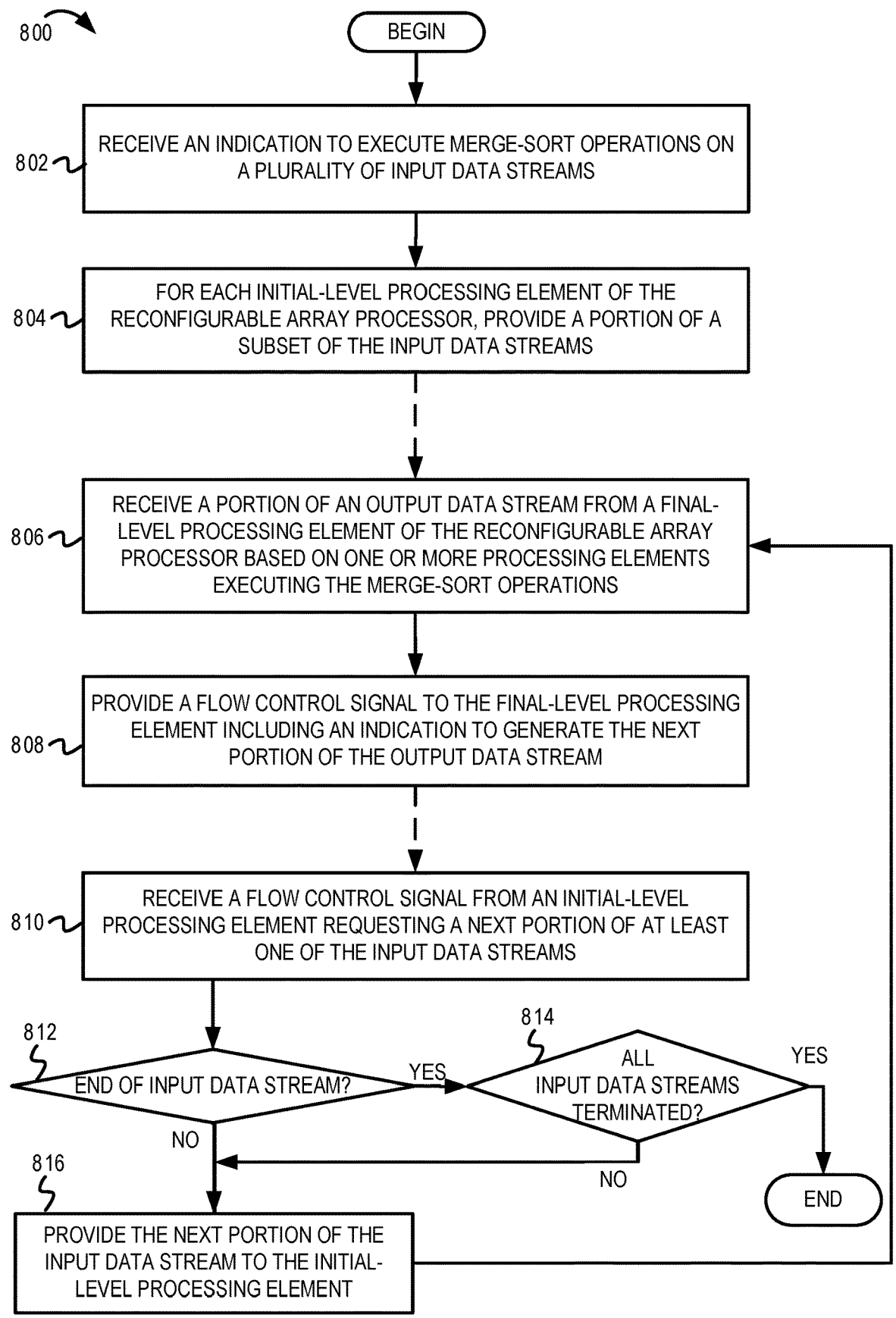
FIG. 8 is a flow diagram illustrating example operations of a processor array manager configured to perform merge sort operations.

FIG. 8 is a flow diagram illustrating example operations 800 of a processor array manager in a merge sort configuration. An indication to execute merge-sort operations on a plurality of input data streams is received at a processor array manager of an array processor (block 802). For example, a central processor of a network device (not depicted) may provide a notification to the processor array manager to execute merge-sort operations on the input data streams. The notification may indicate a source address from which each of the input data streams can be accessed. The array processor may execute merge-sort operations in the background while the central processor (or an application of the network device) executes other operations on one or more of the input data streams. In this manner, the array processor and the central processor may execute their respective operations in parallel on the input data streams. In other embodiments, the array processor executes merge-sort operations at other times relative to the central processor (or application). For example, the central processor (or an application) may operate on the merged and sorted output data stream.

For each initial-level PE of the array processor, a portion of a subset of the input data streams is provided to the initial-level PEs (block 804). The processor array manager determines which input data streams to provide to each initial-level PE. For example, the processor array manager may provide two input data streams to each of four initial-level PEs to merge and sort eight input data streams. Referring to the example of FIG. 5, the processor array manager may provide a portion of the first and second input data streams to the first-level PE 506; a portion of the third and fourth input data streams to the first-level PE 508; and so on. The processor array manager provides a quadword or any other suitable number of bits/bytes of the input data streams to each first-level PE.

In some embodiments, the processor array manager maintains a sliding window for selecting portions of each input data stream. The selected portion of the input data stream that is provided to an initial-level PE may depend on the stride (or step size) and the length of the sliding window. For example, if the length and the stride of the sliding window are 16 bytes, the processor array manager may provide a 16-byte portion (e.g., bytes 0-15) of the input data stream to the initial-level PE. The processor array manager may update the sliding window by the stride (e.g., 16 bytes). After updating the sliding window, the processor array manager may provide the next contiguous 16-byte portion (e.g., bytes 16-31) of the input data stream to the initial-level PE. As described above, each initial-level PE compares the portions of the input data streams and generate corresponding output data based, at least in part, on a comparative sorting technique (e.g., the truth table of Table 1).

A portion of an output data stream is received from a final-level PE of the array processor based, at least in part, on one or more PEs of the array processor executing the merge-sort operations (block 806). The interconnection between block 804 and block 806 is represented using dashed lines to indicate a time delay between providing a portion of the input data stream to an initial-level PE and receiving a portion of the final output data stream from the final-level PE. The processor array manager may store the portion of the final output data stream in a suitable destination address.

A flow control signal including an indication to generate the next portion of the output data stream is provided to the final-level PE (block 808). The processor array manager can provide the flow control signal to implement flow control techniques and to control the rate at which portions of the final output data stream are received at the processor array manager. The processor array manager can provide the flow control signal to the final-level PE in response to receiving the portion of the final output data stream. Referring to the example of FIG. 5, store streaming unit 504 may receive a quadword of the final output data stream generated by final-level PE 518. Store streaming unit 504 may transmit the flow control signal to the final-level PE 518 in response to receiving the quadword of the final output data stream, storing one or more entries from a store queue to a destination address, and/or determining that there is an empty register in the store queue to receive another quadword of the final output data stream. The flow control signal can indicate that the processor array manager successfully received the portion of the final output data stream. The flow control signal can also indicate that the final-level PE should determine and provide the next portion of the final output data stream.

A flow control signal requesting a next portion of at least one of the input data streams is received from an initial-level PE (block 810). The interconnection between block 810 and block 812 is represented using dashed lines to indicate a time delay between providing a flow control signal to the final-level PE after receiving the final output data stream from the final-level PE, and receiving a request for the next portion of an input data stream from an initial-level PE as the flow control signal propagates up the hierarchy of PEs.

Block 812 depicts a determination of whether the end of the input data stream is detected. For example, in response to receiving the flow control signal from an initial-level PE, the processor array manager can determine whether the next portion of the input data stream represents an end-of-stream indicator associated with the input data stream. If the end-of-stream indicator is detected, the processor array manager provides the end-of-stream indicator to the initial level PE. The processor array manager then terminates the input data stream and the flow continues at block 814. If the end-of-stream indicator associated with the input data stream is not detected, the flow continues at block 816.

Block 814 depicts a determination of whether all the input data streams are terminated. A determination that all the input data streams are terminated indicates that all the input data streams were merged and sorted. In some embodiments, the processor array manager may also generate a notification indicating that all the input data streams are merged and sorted. If all the input data streams are terminated, the sorting operation is deemed complete and the flow ends. Otherwise, if at least one input data stream is not terminated, then another input step is required and the flow loops back to block 816.

The next portion of input data stream is provided to the initial-level PE (block 816). For example, the processor array manager may provide a first portion (e.g., bytes 0-15) of the input data stream to an initial-level PE. In response to receiving a flow control signal from the initial-level PE, the processor array manager may provide a next portion (e.g., bytes 16-31) of the input data stream to the initial-level PE. From block 816, the flow loops back to block 806.

Although not depicted in FIG. 8, in some embodiments, the flow 800 may move from block 804 to block 812. In other words, the processor array manager may receive a flow control signal including a request for the next portion of a first input data stream from a first initial-level PE after providing a portion of a second input data stream to a second initial-level PE. Although FIG. 8 describes the flow looping back to block 806 from block 816, embodiments are not so limited. In some embodiments, after providing the next portion of an input data stream to an initial-level PE (block 816), the flow loops back to block 810. For example, after providing the next portion of the input data stream to a first initial-level PE, the processor array manager may receive a flow control signal from a second initial-level PE. As another example, after providing the next portion of the input data stream to a first initial-level PE, the processor array manager may receive the output data from a final-level PE. Additionally, after the processor array manager determines that all the input data streams (to be merged and sorted) are not terminated (block 814), the flow can loop back to block 810 in response to receiving a flow control signal from an initial-level PE.

Figure 9:
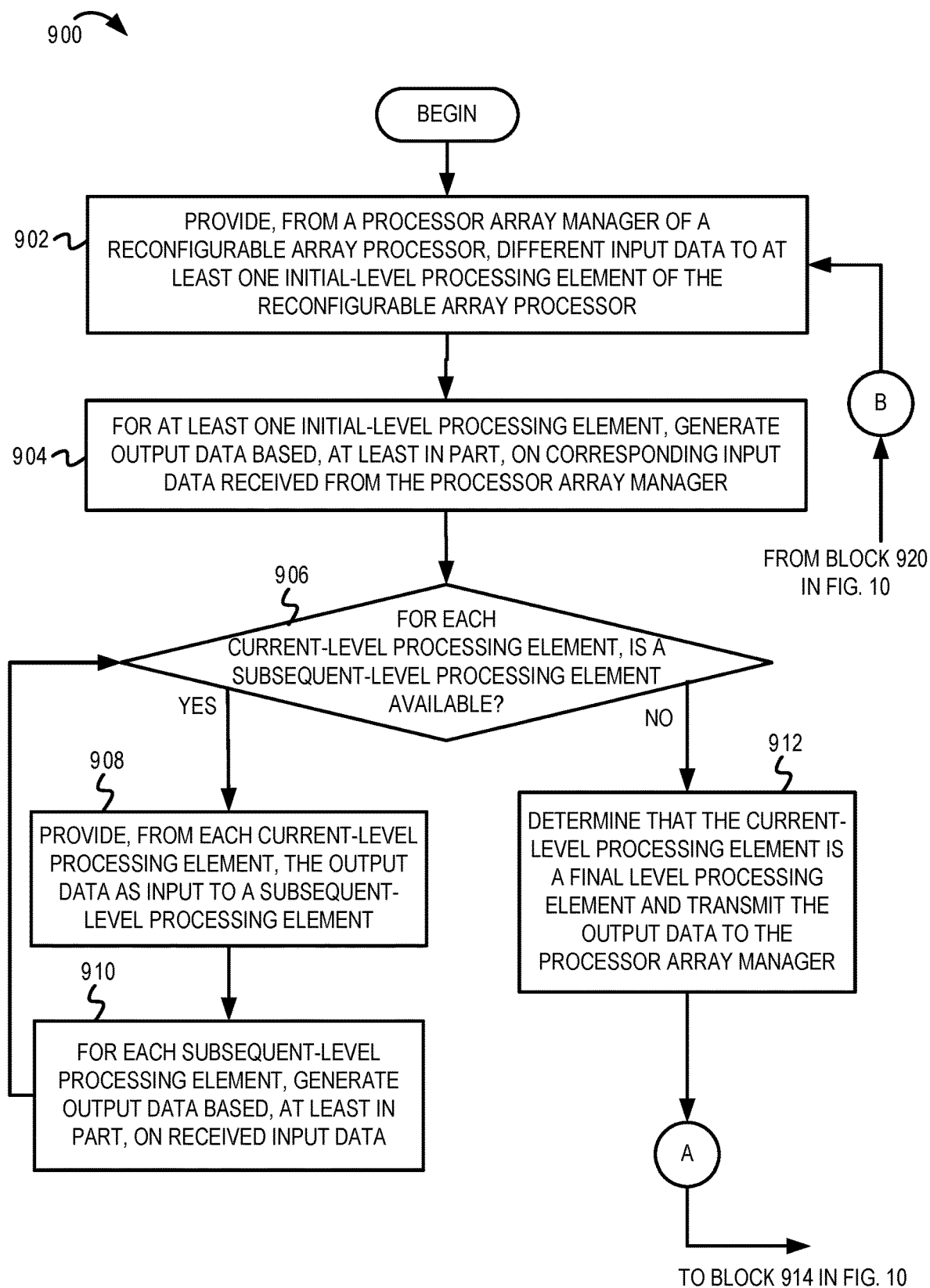
FIG. 9 is a flow diagram illustrating example operations of an array processor configured to perform merge sort operations.
Figure 10:
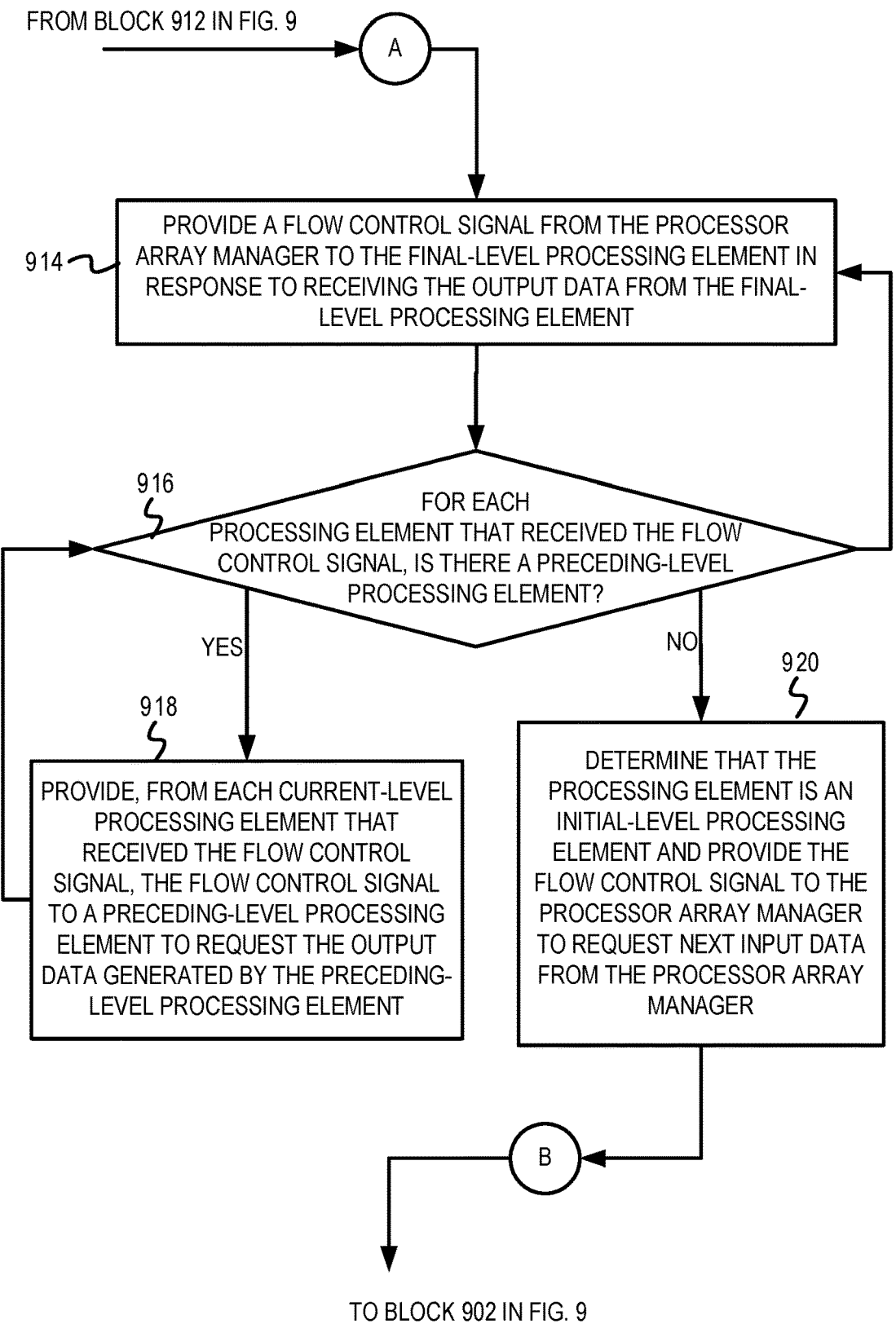
FIG. 10 is a continuation of FIG. 9 and also illustrates example operations of an array processor configured to perform merge sort operations.

FIGS. 9 and 10 depict a flow diagram illustrating example operations of an array processor in a merge sort configuration. Flow 900 begins at block 902 with different input data portions being provided from a processor array manager of an array processor to at least one initial-level PE of the array processor. The processor array manager determines which input data streams to provide to each initial-level PE and fetches the portion of each input data stream from a corresponding source address. Referring to the example of FIG. 5, the processor array manager may provide a portion of the first and second input data streams to the first-level PE 506; a portion of the third and fourth input data streams to the first-level PE 508; and so on.

For at least one initial-level PE, output data is generated based, at least in part, on corresponding input data received from the processor array manager (block 904). As described above, an initial-level PE can compare the received portions of the input data streams and generate corresponding output data based, at least in part, on a sorting technique (e.g., the truth table of Table 1).

For each current-level PE, it is determined whether there is a subsequent-level PE (block 906). After generating the output data, the PE may determine whether it is coupled with another subsequent-level (or lower-level) PE or whether it is coupled with a store streaming unit of the processor array manager. The PE provides the output data to the subsequent-level PE or to the processor array manager depending on the position of the PE in the hierarchy.

For each current-level PE, the output data generated by the current-level PE is provided to a subsequent-level PE (block 908). Referring to the example of FIG. 5, initial-level PE 506 can compare input data received from load streaming unit 502 and provide the output data to a subsequent-level PE 514. Second-level PE 514 can compare input data received from initial-level PEs 506 and 508 and provide the output data to a subsequent-level PE 518. More generally, if the current-level PE is coupled with a subsequent-level PE, the current-level PE can compare input data received from a preceding-level PE (or the processor array manager) and provide the output data to a subsequent-level PE.

For each subsequent-level PE, output data is generated based, at least in part, on received input data (block 910). With reference to the example of FIG. 5, second-level PE 514 may generate output data based on comparing input data received from initial-level PEs 506 and 508. After generating the output data, the subsequent-level PE may be designated as a new current-level PE and the flow loops back to block 906, where the new current-level PE determines whether to transmit the output data to the processor array manager or to a PE in the next level.

Block 912 depicts a determination that the current-level PE is a final level PE and the output data is transmitted to the processor array manager (block 912). With reference to the example of FIG. 5, final-level PE 518 may receive input data from preceding-level PEs 514 and 516. Final-level PE 518 may compare the input data received from preceding-level PEs 514 and 516 and select one of the input data as the output data associated with final-level PE 518. The final output data stream generated by final-level PE 518 may be a merged and sorted representation of the input data streams provided to the initial-level PEs at block 902. The flow continues at block 914 in FIG. 10.

A flow control signal is provided from the processor array manager to the final-level PE in response to receiving the output data from the final-level PE (block 914). The flow control signal can indicate that the processor array manager successfully received the portion of the final output data stream generated by the final-level PE. The flow control signal can also indicate that the final-level PE should determine and provide the next portion of the final output data stream.

For each PE that received the flow control signal, it is determined whether there is a preceding-level PE (block 916). For example, the PE that receives the flow control signal can determine whether it is configured to receive input data from the processor array manager or from preceding-level PEs. The PE may provide the flow control signal to at least one preceding-level PE or to the processor array manager depending on the position of the PE in the hierarchy. If the PE is coupled with a preceding-level PE, the flow continues at block 918. Otherwise, the flow continues at block 920.

For each current-level PE that received the flow control signal, a flow control signal is provided from the current-level PE to a preceding-level PE to request the output data generated by the preceding-level PE (block 918). As described above with reference to FIGS. 5-7, if the current-level PE is coupled with a preceding-level PE, the current-level PE can transmit a flow control signal to the preceding-level PE. After receiving the flow control signal, the preceding-level PE may be designated as a new current-level PE and the flow loops back to block 916, where the new current-level PE determines whether to transmit the flow control signal to the processor array manager or to a PE in the preceding level.

Block 920 depicts a determination that the current-level PE is an initial-level PE and the flow control signal is provided to the processor array manager to request next input data from the processor array manager (block 920). As described above with reference to FIGS. 5-7, if the current-level PE is not coupled with a preceding-level PE, it is determined that the PE is an initial-level PE that is coupled with a load streaming unit of the processor array manager. The current-level PE can transmit a flow control signal to the processor array manager. The flow loops back to block 902 in FIG. 9 where the processor array manager provides next input data to the PE in response to receiving the flow control signal.

It should be understood that FIGS. 1-10 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently.

Although examples describe the interconnections between the PEs being configured to form one hierarchy (or tree structure) and to generate one final output data stream, embodiments are not so limited. In other embodiments, the PEs of an array processor may be configured to form multiple hierarchies and to generate multiple final output data streams. In one implementation, an array processor with 16 PEs may be configured so that 15 PEs are used to merge and sort 16 input data streams into one final output data stream, as depicted with reference to FIG. 4B. In another implementation, the array processor may be configured so that one set of 7 (of 16) PEs form a first hierarchy, and another set of 7 PEs form a second hierarchy. The first and the second hierarchies of PEs may each be configured similar to the hierarchy of FIG. 5. The first set of PEs may operate on a first set of 8 input data streams to yield a first final output data stream. The second set of PEs may operate on a second set of 8 input data streams to yield a second final output data stream. In some embodiments, the first set and second set of input data streams may be independent of each other (e.g., performing merge-sort operations for two independent applications). In other embodiments, the first set of input data streams may be the same as the second set of input data streams. In this embodiment, the first and second set of PEs may operate on the same set of input data streams using different sort algorithms to sort the input data differently. However, in other embodiments, the array processor may use any suitable number of PEs to form any suitable number of hierarchies and to consolidate M input data streams into N sorted output data streams (M>N).

Although FIG. 5 describes merging multiple input data streams and sorting these input data streams in the ascending order, embodiments are not so limited. In other embodiments, multiple input data streams may be sorted in another suitable sequence. For example, the input data streams may be sorted in descending order. In some embodiments, a single input data stream may be sorted in a suitable sequence. For this, portions of the same input data stream may be provided to different PEs. The PEs may execute the merge-sort operations described above to sort the portions of the same input data stream in the appropriate sequence (e.g., in ascending order). For example, a first and second quadwords of a first input data stream may be provided to PE 506; a third and fourth quadwords of the first input data stream may be provided to PE 508; a fifth and sixth quadwords of the first input data stream may be provided to PE 510; and a seventh and eighth quadwords of the first input data stream may be provided to PE 512. The PEs 506-518 may execute the operations described above to sort the quadwords of the first input data stream in the appropriate sequence.

Although examples describe operations for configuring the array processor to execute merge-sort operations on one or more input data streams, embodiments are not so limited. In an alternate embodiment, the array processor can be configured to implement radix sort operations. During a radix sort initialization, execution control unit 108 provides a radix-sort program to configure the processor array manager 114 and the PEs 102. Based on the radix-sort program received from the execution control unit 108, the load streaming unit 110 determines how many input data units are to be sorted, the length (e.g., number of bits) in each input data unit, a source address from which to access the input data units, and a radix. The radix represents the number of input data unit comparisons that are performed per iteration to sort the input data units in the appropriate sequence. The radix-sort program may also assign a bin identifier to each of the PEs of the array processor. Furthermore, the radix-sort program may indicate that one or more of the interconnections between the PEs should be disabled, and that the connections between the processor array manager and each of the PEs should be maintained. The radix-sort program may also indicate that the register file (or the input queue) components of the PEs are enabled and that other components of the PEs should be disabled. After the processor array manager and the PEs are initialized, the processor array manager can execute radix-sort operations to sort multiple N-bit input data units using a radix-M sort.

For example, load streaming unit 110 may determine to sort 1000 64-bit input data units using a radix 16 (e.g., $2^4$) sort by comparing 4 bits per input data unit at each iteration. The processor array configuration would include assigning each of 16 bins (bins 0 through 15) to a respective one of 16 PEs. During each iteration, load streaming unit 110 compares a next sequence of four bits of each of the 1000 input data units to the PE bin numbers and sorts the input data units by routing them to PEs having matching bin numbers. For example, a first PE may be associated with a bin identifier of '0000,' a second PE may be associated with a bin identifier of '0001,' and so on. In this example, if bits 0-3 of the first input data unit are '0001', the first input data unit may be sorted in bin 1; if bits 0-3 of the second input data unit are '0101', the second input data unit may be sorted in bin 5; and so on. In other words, load streaming unit 110 may transmit the first input data unit to the PE with the bin identifier 0001, transmit the second input data unit to the PE with the bin identifier 0101, etc. During a second iteration, load streaming unit 110 compares bits 4-7 of each of the same 1000 input data units and sorts each of the input data units into an appropriate PE bin based on the value represented by the bits 4-7. Load streaming unit 110 may continue sorting the 1000 input data units at each iteration until the 1000 input data units are sorted based on bits 60-63.

The PEs may store the input data units received at each iteration in an output register and/or an output queue. Each PE may provide the input data units in the output register (or output queue) to store streaming unit 112 in response to receiving a control signal from the store streaming unit 112, such as may be sent after a predetermined number of input data units are stored, after the output queue is full, etc. Store streaming unit 112 stores the data units received from each PE at a corresponding destination address for the bin. For example, the input data units received from the first PE may be stored at a first set of memory locations beginning at a first destination address associated with a first bin; the input data units received from the second PE may be stored at a second set of memory locations beginning at a second destination address associated with a second bin; and so on.

As will be appreciated by one skilled in the art, aspects of the present inventive subject matter may be embodied as a system, method, and/or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in a computer readable storage medium (or media) having computer readable program instructions embodied thereon. Furthermore, aspects of the present inventive subject matter may be a system, a method, and/or a computer program product. The computer program product may include a computer readable storage medium (or media) having computer readable program instructions thereon for causing a processor to carry out aspects of the present inventive subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
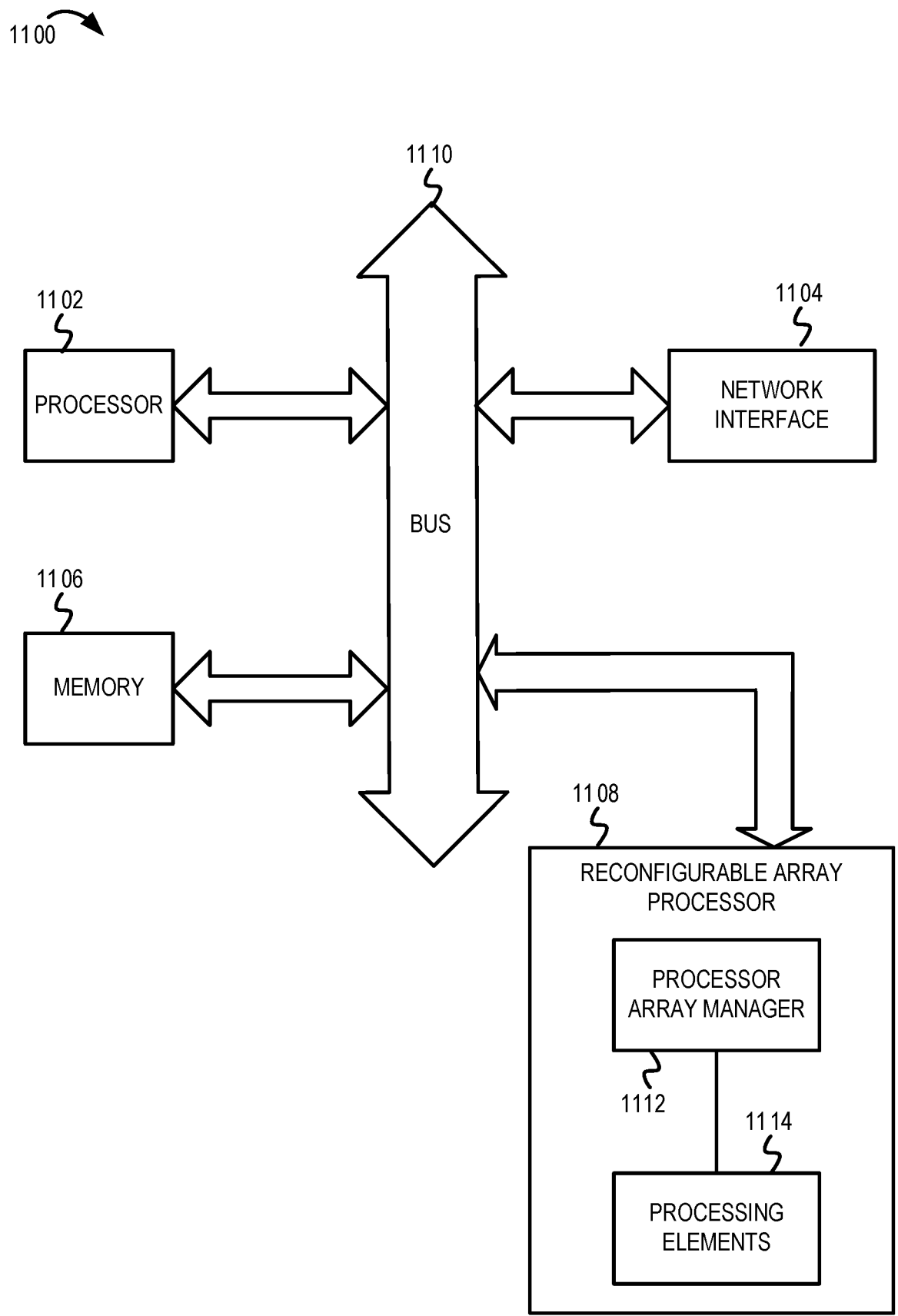
FIG. 11 is a system diagram of an example electronic device including a merge-sort configuration in an array processor according to an embodiment of the disclosure.

FIG. 11 depicts an example electronic device 1100 including a merge-sort configuration in a array processor according to an embodiment of the disclosure. The electronic device 1100 includes a processor 1102 (possibly including multiple processors, multiple cores, multiple nodes, and/or implementing multi-threading, etc.). The electronic device 1100 includes memory 1106. The memory 1106 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The electronic device 1100 also includes a bus 1110 (e.g., PCI, ISA, PCI-Express, HyperTransport®, InfiniBand®, NuBus, etc.), a network interface 1104 (e.g., an ATM interface, an Ethernet interface, a Frame Relay interface, SONET interface, wireless interface, etc.), and a storage device(s) (e.g., optical storage, magnetic storage, etc.) (not depicted). The processor 1102, the memory 1106, and the network interfaces 1104 may be coupled to the bus 1110.

The electronic device 1100 also includes a array processor 1108. The array processor 1108 includes a processor array manager 1112 coupled with PEs 1114. The array processor 1108 can implement functionality for merging and sorting one or more input data streams to yield one or more output data streams as described above with reference to FIGS. 1-10. Specifically, PEs 1114 may be organized in a hierarchical manner. Each PE can compare two or more input data values and can conditionally select one of the input data values as the output data depending on the results of the comparison and on whether the input data value is an end-of-stream indicator. The processor array manager 1112 can provide input data values (e.g., from different input data streams) to each first-level PE. Each first-level PE can generate its respective output data and provide the output data as an input data value to a subsequent-level PE. More generally, each PE can compare input data values received from a preceding-level PE (or the processor array manager) and provide the output data to a subsequent-level PE. A final-level PE can provide final output data to the processor array manager 1112 for subsequent storage. The final output data may be representative of the merged and sorted input data streams.

The array processor 1108 can be implemented in any combination of software, hardware, or both. Any one of these functionalities may be partially (or entirely) implemented in hardware and/or on the processor 1102. For example, the functionality may be implemented with a system-on-a-chip (SoC), an application specific integrated circuit (ASIC), in logic implemented in the processor 1102, in a co-processor on a peripheral device or card, etc. Further, realizations may include fewer or additional components not illustrated in FIG. 11 (e.g., video cards, audio cards, additional network interfaces, peripheral devices, etc.). For example, in addition to the processor 1102 coupled with the bus 1110, the communication module 1108 may comprise at least one additional processor. Although illustrated as being coupled to the bus 1110, the memory 1106 may be coupled to the processor 1102. In some embodiments, the memory 1106 may implement functionality to implement the embodiments described above. The memory 1106 may include one or more functionalities that facilitate implementation of merge-sort operations using an array processor.

While the embodiments are described with reference to various implementations and exploitations, it will be understood that these embodiments are illustrative and that the scope of the inventive subject matter is not limited to them. In general, an array processor in a merge-sort configuration as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An array processor comprising:
    a plurality of processing elements, wherein each processing element of the plurality of processing elements includes a plurality of micro-programs; and
    a managing element coupled to the plurality of processing elements, the managing element configured to:
        establish connections between the plurality of processing elements in accordance with at least one member of a group consisting of a type of sort to be performed by the array processor, a number of input data streams, and a number of output data streams;
        provide a plurality of input data portions to each of a first subset of the plurality of processing elements; and
        receive output data from each of a second subset of the plurality of processing elements based, at least in part, on a comparatively sorted combination of the plurality of input data portions provided to the first subset of the plurality of processing elements;
    wherein each processing element of the plurality of processing elements is configurable by the managing element to:
        compare first input data portions of the plurality of input data portions provided to the processing element of the first subset of the plurality of processing elements or second input data portions received from two or more processing elements other than the processing element;
        select an input data portion of the first input data portions or the second input data portions to be output data of the processing element based on the comparison; and
        provide the output data of the processing element to either the managing element or as an input to one of the plurality of processing elements;
    wherein the managing element is configured to:
        provide a control signal to each of the plurality of processing elements to cause each of the plurality of processing elements to select a micro-program of the plurality of micro-programs in accordance with the type of sort to be performed by the array processor.

2. The array processor of claim 1, wherein the managing element is configured to:
    determine whether an end-of-stream indicator associated with an input data stream is detected by the managing element, wherein the input data stream comprises a next input data portion;
    provide the end-of-stream indicator to a processing element in response to determining that the end-of-stream indicator is detected; and
    provide the next input data portion of the input data stream in response to determining that the end-of-stream indicator was not detected.

3. The array processor of claim 1, wherein each of the plurality of processing elements include a first input queue and a second input queue, and wherein each of the plurality of processing elements are configured to:
    during said compare of the first input data portions or the second input data portions, determine whether a head position of either the first input queue or the second input queue includes an end-of-stream indicator;

in response to a determination that the head position of the first input queue but not the second input queue includes the end-of-stream indicator, select and remove the input data portion from the head position of the second input queue, until the end-of-stream indicator is detected in the head position of both the first input queue and the second input queue; and in response to a determination that the head position of both the first input queue and the second input queue include the end-of-stream indicator, remove both end-of-stream indicators and send one end-of-stream indicator from the processing element to either a store streaming unit in the managing element or to an input of one of the plurality of processing elements.

4. The array processor of claim 1, wherein at least one of the second subset of the plurality of processing elements:

receives a first control signal from the managing element in response to providing the output data generated by the processing element to the managing element; and transmits a second signal to a processing element of a third subset of the plurality of processing elements to request output data generated by the processing element of the third subset of the plurality of processing elements.

5. The array processor of claim 1, wherein at least a first processing element of the first subset of the plurality of processing elements:

receives a first portion of a first input data stream and a second portion of a second input data stream from the managing element; and selects the first portion or the second portion as output data provided by the first processing element of the first subset.

6. The array processor of claim 1, wherein at least a first processing element of the first subset of the plurality of processing elements:

receives a first portion of a first input data stream and a second portion of the first input data stream from the managing element; and selects the first portion or the second portion of the first input data stream as the output data provided by the first processing element of the first subset.

7. A method for sorting data in an array processor, the method comprising:

establishing connections between a plurality of processing elements in accordance with at least one member of a group consisting of a type of sort to be performed by the array processor, a number of input data streams, and a number of output data streams;

receiving, by a first tier processing element of the plurality of processing elements, input data portions from a managing element of the array processor, wherein each processing element of the plurality of processing elements includes a plurality of micro-programs;

providing, by the managing element, a control signal to each of the plurality of processing elements to cause each of the plurality of processing elements to select a micro-program of the plurality of micro-programs in accordance with the type of sort to be performed by the array processor;

comparing, by the first tier processing element, the input data portions received from the managing element;

selecting, by the first tier processing element, an input data portion of the input data portions to be an output data portion based on the comparison; and providing, by the first tier processing element, the output data portion as an input to a second tier processing element of the plurality of processing elements, wherein the second tier processing element generates output data based on a comparison of output data portions received from at least two first tier processing elements.

8. The method of claim 7, further comprising:

disabling at least one component of the first tier processing element to configure the first tier processing element to execute merge-sort operations.

9. The method of claim 7, wherein the input data portions include a first portion of a first input data stream and a second portion of a second input data stream; and wherein selecting, by the first tier processing element, the input data portion includes selecting, by the first tier processing element, the first portion or the second portion as the output data portion associated with the first tier processing element.

10. The method of claim 7, wherein the input data portions include a first portion of a first input data stream and a second portion of the first input data stream; and wherein selecting, by the first tier processing element, the input data portion includes selecting the first portion or the second portion of the first input data stream as the output data portion associated with the first tier processing element.

* * * * *